US012081935B2

(12) United States Patent
Farver

(10) Patent No.: US 12,081,935 B2
(45) Date of Patent: Sep. 3, 2024

(54) IN-EAR HEADPHONE DEVICE WITH ACTIVE NOISE CONTROL

(71) Applicant: LIZN ApS, Vejle Øst (DK)

(72) Inventor: Niels Farver, Knebel (DK)

(73) Assignee: LIZN ApS, Vejle Ost (DK)

( * ) Notice: Subject to any disclaimer, the term of this patent is extended or adjusted under 35 U.S.C. 154(b) by 190 days.

(21) Appl. No.: 17/905,052

(22) PCT Filed: Feb. 25, 2021

(86) PCT No.: PCT/DK2021/050053
§ 371 (c)(1),
(2) Date: Aug. 25, 2022

(87) PCT Pub. No.: WO2021/175392
PCT Pub. Date: Sep. 10, 2021

(65) Prior Publication Data
US 2023/0141100 A1 May 11, 2023

(30) Foreign Application Priority Data
Mar. 3, 2020 (DK) .......................... PA 2020 70142

(51) Int. Cl.
*H04R 1/10* (2006.01)
*G10K 11/178* (2006.01)

(52) U.S. Cl.
CPC ......... *H04R 1/1083* (2013.01); *H04R 1/1016* (2013.01); *H04R 2460/01* (2013.01)

(58) Field of Classification Search
None
See application file for complete search history.

(56) References Cited

U.S. PATENT DOCUMENTS 4,644,581 A * 2/1987 Sapiejewski ......... H04R 1/1083 381/372
5,182,774 A * 1/1993 Bourk .................. H04R 1/1083 381/372

(Continued)

FOREIGN PATENT DOCUMENTS

WO WO2018/127263 A2 7/2018
WO WO2018/167538 A1 9/2018

OTHER PUBLICATIONS

International Search Report and Written Opinion dated May 19, 2021 in International Application No. PCT/DK2021/050053, 11 pages.

*Primary Examiner* — Qin Zhu
(74) *Attorney, Agent, or Firm* — Lee & Hayes, P.C.

(57) ABSTRACT

An in-ear headphone device for insertion in an ear canal of a person. The in-ear headphone device comprises a noise microphone, a loudspeaker and a signal processor arranged to provide an active noise control signal on the basis of a recorded audio signal from said noise microphone, wherein said loudspeaker is arranged to reproduce said active noise control signal in said ear canal. Further, the device comprises a damped vent comprising one or more vent elements and one or more dampening elements, said damped vent being arranged to couple said ear canal to an external acoustic environment. The damped vent is characterized by an inward vent transfer function HVI from said external acoustic environment to said ear canal. The damped vent is arranged to dampen an acoustic resonance of said one or more vent elements such that a resonance magnitude of said inward vent transfer function HVI of said damped vent in a resonance frequency range from 100 Hz to 2 kHz is maximally 3 dB greater than a reference magnitude of said inward vent transfer function HVI in a reference frequency range from 20 Hz to 100 Hz.

20 Claims, 18 Drawing Sheets

(56) References Cited

U.S. PATENT DOCUMENTS

Figure 1:
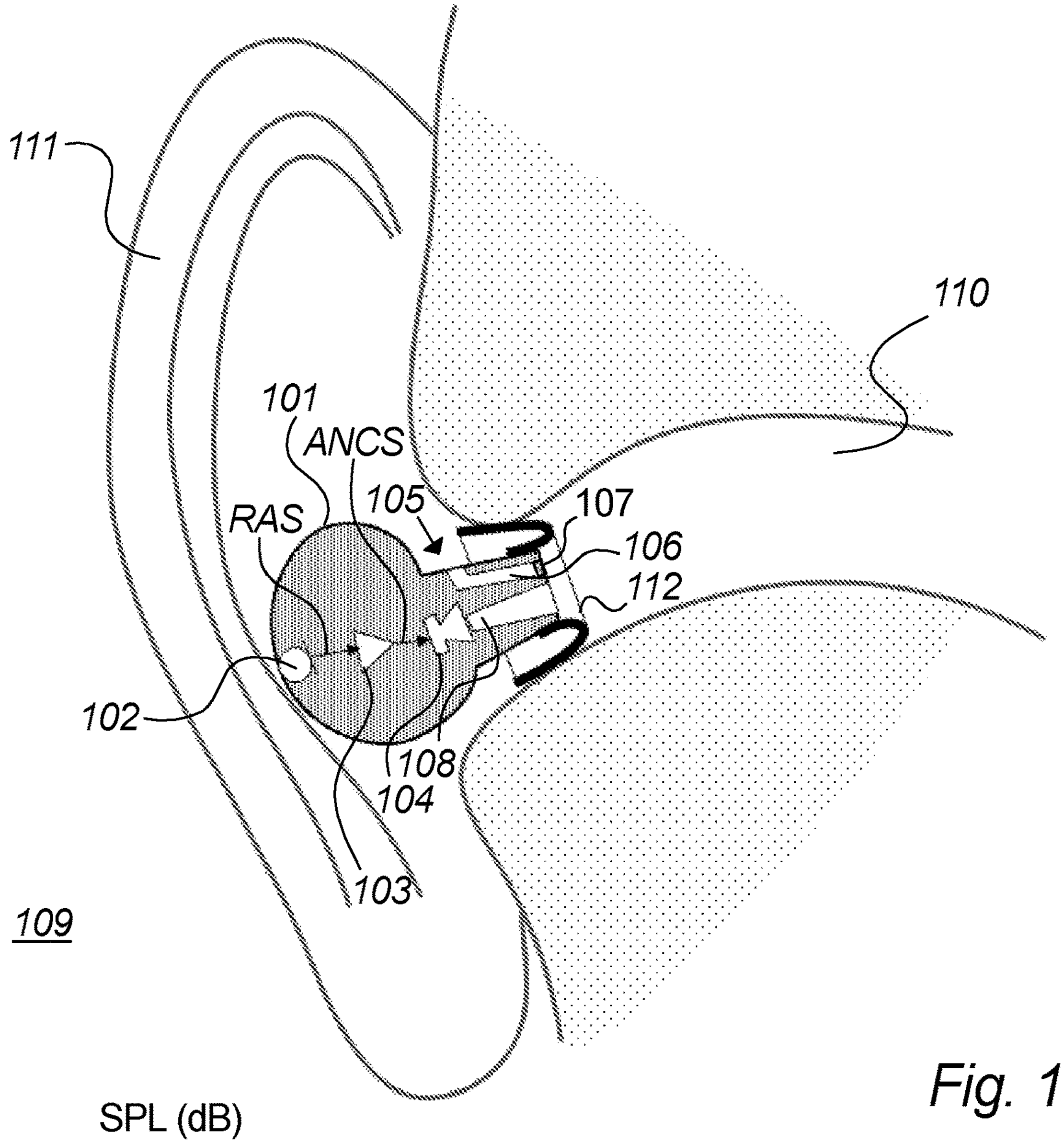

| | | | | |
|---|---|---|---|---|
| 6,205,227 | B1 * | 3/2001 | Mahoney | H04R 25/656 381/328 |
| 6,567,525 | B1 * | 5/2003 | Sapiejewski | H04R 1/1083 381/372 |
| 6,766,031 | B1 * | 7/2004 | Westermann | H04R 25/658 381/328 |
| 2013/0308786 | A1 | 11/2013 | Sibbald et al. | |
| 2015/0023515 | A1 * | 1/2015 | Reimert | H04R 1/1083 381/71.6 |
| 2019/0356991 | A1 | 11/2019 | Farver | |

* cited by examiner

IN-EAR HEADPHONE DEVICE WITH ACTIVE NOISE CONTROL

CROSS REFERENCE TO RELATED APPLICATIONS

This application is a U.S. National Phase Application of International Application No. PCT/DK2021/050053, filed Feb. 25, 2021, which claims the benefit of Danish Application No. PA 2020 70142, filed Mar. 3, 2020, both of which are incorporated herein by reference in their entirety.

FIELD OF THE INVENTION

The present invention relates to an in-ear headphone device arranged to provide active noise control.

BACKGROUND OF THE INVENTION

The field of in-ear headphone devices is swiftly evolving, especially due to the increasing capabilities of digital electronics. One key prospect of headphone devices is the capability to provide active noise control, which is a feedback process where a microphone records sound and a loudspeaker eliminates this sound by utilizing the principle of destructive interference. As a result, undesired noise, for example from a noisy external environment, may be considerably reduced in the ear canal of a user of such a device.

However, in-ear headphone devices, particularly in-ear headphone devices arranged to provide active noise control, suffer from several problems which impair the functionality of the device. One example is dynamic acoustic leaks occurring when a user is active, most notably during jaw movement, in which small air canals open from the external environment to the ear canal to disrupt the otherwise tight partition to the ear canal. Such leaks may let in increased undesired noise as well as critically distort the active noise control and sound reproduction performed by the loudspeaker.

Despite the computational power accommodated with modern electronics, rapidly changing conditions as provided by dynamic acoustic leaks are not possible to properly manage within the scope of digital signal processing without major distortions for the user.

SUMMARY OF THE INVENTION

The inventors have identified the above-mentioned problems and challenges related to active noise control in in-ear headphones, and subsequently made the below-described invention which may reduce some of the disadvantages of the know techniques.

The invention relates to an in-ear headphone device for insertion in an ear canal of a person, said in-ear headphone device comprising: a noise microphone, a loudspeaker and a signal processor arranged to provide an active noise control signal on the basis of a recorded audio signal from said noise microphone, wherein said loudspeaker is arranged to reproduce said active noise control signal in said ear canal; and a damped vent comprising one or more vent elements and one or more dampening elements, said damped vent being arranged to couple said ear canal to an external acoustic environment; wherein said damped vent is characterized by an inward vent transfer function $H_{VI}$ from said external acoustic environment to said ear canal; and wherein said damped vent is arranged to dampen an acoustic resonance of said one or more vent elements such that a resonance magnitude of said inward vent transfer function $H_{VI}$ of said damped vent in a resonance frequency range from 100 Hz to 2 kHz is maximally 3 dB greater than a reference magnitude of said inward vent transfer function $H_{VI}$ in a reference frequency range from 20 Hz to 100 Hz.

An in-ear headphone device may be understood as a headphone device arranged to be worn by a user by fitting the device in the user's outer ear, such as in the concha, next to the ear canal. The in-ear headphone device may further extend at least partially into the ear canal of the user. The in-ear headphone device may typically be shaped to fit at least partly within the outer ear and/or the ear canal, thereby ensuring fitting of the device to the user's ear. An in-ear headphone device may also be understood as an in-ear headphone, ear-plug, in-the-canal headphone, an earbud or a hearable.

An in-ear headphone may for example allow a user to listen to an audio source with minimal sound disturbing the surroundings. Applications of an in-ear headphone may thus for example be listening to media, performing telecommunication, performing hearing aid, speech intelligibility enhancement, and active noise control.

The in-ear headphone device according to the invention comprise a noise microphone, a loudspeaker, and a signal processor arranged to provide active noise control in combination with the loudspeaker, based on sound recorded by the noise microphone.

Sound may be understood as an audible pressure wave. A loudspeaker may generate sound by receiving a driving signal, e.g. an alternating current, which may generate a reciprocating motion of part of the loudspeaker, e.g. a diaphragm, to push air and thus reproduce the received driving signal as sound. And in a reversed manner, a microphone may convert sound into an electrical signal based on voltages and/or currents when a pressure wave reciprocates a movable part of the microphone to generate the electrical signal.

Active noise control may be understood as a method for reducing unwanted sound by addition of an active noise control sound which has opposite sound pressure compared to the unwanted sound. Active noise control may also be referred to as active noise reduction or active noise cancellation and may be thought of as a type of feedback.

To provide active noise control, an estimate or representation of the unwanted sound is required to produce an opposite sound. For this purpose, a noise microphone, which comprises one or more microphones, is provided to record a representation of the unwanted sound. The noise microphone may be located to either primarily record sound from the ear canal of a user, i.e. more or less directly measuring the unwanted sound as the user perceives it, or primarily record sound from the environment around the user, i.e. the external acoustic environment, which indirectly represents unwanted sound as the user will perceive it through the inward transfer function $H_{TI}$ of the headphone device. It is understood that an embodiment may also have a distributed noise microphone comprising microphones both external and internal in the same device.

Based on the recorded sound from the noise microphone, an active noise control signal may be generated, which is preferably designed to cancel unwanted sound within the ear of the user by destructive interference when reproduced by the loudspeaker. Preferably, this signal is the additive inverse of the unwanted sound and may thus be obtained from the unwanted sound for example by inverting the phase, inverting the polarity, or taking the additive inverse. Further, the active noise control signal is preferably also adapted to account for the non-ideal frequency responses of the actual microphone, loudspeaker and signal processing, etc., so that the reproduced sound will be as close to the inverse of the unwanted sound as practically possible. Further, in practice, the active noise control may preferably be restricted to certain frequency bands, for example audible frequencies below 1 kHz.

The active noise control signal may be reproduced by the loudspeaker of the headphone to generate active noise control sound, and thus cancel unwanted sound within the ear of a user. The same loudspeaker may simultaneously emit another audio signal, e.g. music or speech, which may preferably be substantially unaffected by the active noise control. An audio signal emitted by the loudspeaker which is not emitted for purposes of active noise control, e.g. music or speech, may be referred to as a desired audio signal.

Active noise control is often combined with passive noise control, which may typically be understood as sound reduction by noise-isolating materials. An in-ear headphone device with no substantial passive noise control may typically not be able to generate sufficient active noise control sound to properly cancel unwanted sound. Therefore, in-ear headphone devices arranged to provide active noise control is typically arranged to provide an approximately airtight partition between the ear canal and the external environment. This may for example be achieved by a flexible tip arranged to provide acoustic sealing.

In practice it is not possible to achieve an airtight partition in in-ear headphone devices, among others due to the irregular geometries of the ear, and in particular during jaw movements. Even with a tip as flexible as practically possible when also taking into account durability, cost, etc., there will almost always leak sound past and through the headphone device into the ear canal. This dynamic nature of the noise transfer function requires the active noise control to continuously adapt the algorithm that produces the active noise control signal to fit the changing inward total transfer function $H_{TI}$. This continuous adaptation may further require heavy changes of filter coefficients for each filter update during changes in the leak, leading to frequent mismatches of the active noise control signal compared to the actual noise, which results in audible artefacts.

The transformation which sound of different frequencies undergoes when propagating from one point to another may be described by a transfer function H(s). A transfer function may both describe an efficiency of propagation, e.g. through the magnitude or absolute value G of the transfer function, and the phase shift $\phi$ that the sound undergoes. A phase shift may be related to the group delay $\tau_g$, being the negative of the derivative of the phase shift $\phi$ with respect to frequency, describing the change in time delay between different frequencies during the propagation.

In context of an in-ear headphone device, the transfer function describing how sound is affected when propagating from an outside environment to the ear canal may be described by an inward total transfer function $H_{TI}$. Preferably, active noise control of an in-ear headphone device is designed to function in accordance with this inward total transfer function $H_{TI}$, e.g. a frequency at which noise is efficiently transmitted through the device requires an active noise control signal of larger amplitude to be cancelled in the ear canal of a user, than a frequency which is inefficiently transmitted.

Furthermore, an inward total transfer function $H_{TI}$ has an associated phase shift/group delay, which describes to what extent frequencies are delayed when transmitted from the outside environment to the ear canal. Preferably, active noise control is designed to function in accordance with this group delay, e.g. if a frequency is transmitted with a large group delay, the corresponding active noise control signal should be delayed accordingly.

As described above, the active noise control relies on a signal recorded by the noise microphone, to generate an active noise control signal. However, the noise microphone may also record any sound of a desired audio signal escaping the ear canal through a leak past the headphone device and/or through the headphone device itself. This may cause an undesirable feedback effect, which may be referred to as loudspeaker feedback. Loudspeaker feedback may be addressed and removed by performing signal processing accordingly, based on the fact that the processor knows at least approximately what sound the loudspeaker is generating. To do so, a properly characterised transfer function which describes the efficiency with which sound is transmitted from the ear canal to the outside environment, specifically to the microphone or microphones, is required. This transfer function may be referred to as an outward total transfer function $H_{TO}$.

The inventors have identified a number of problems and challenges which have substantially negative impact on the performance in some or all use cases of typical in-ear headphone devices arranged to provide active noise control. These prominent issues are now introduced in detail. Afterwards, a counterintuitive, yet simple, solution to these issues is presented, as conceived and developed by the inventors.

A general problem for in-ear headphone devices with acoustic sealing is the occlusion effect, which arises when the ear canal is blocked and is most pronounced when the user speaks. The user's own speech may be carried by bone and tissue in the form of vibrations which may in turn vibrate the ear canal and give rise to a sound pressure within the ear canal. Especially at low frequencies this sound pressure is greatly increased when the ear canal is occluded/blocked by a headphone device. The user will thus experience muffled, hollow, booming, echoed, or distorted replication of the users own voice when speaking and wearing an occluding device.

The occlusion effect of an in-ear headphone device may be suppressed by a vent, i.e. a channel or duct, arranged to couple the ear canal to the external environment. Note however, this is not a logical element to incorporate in an in-ear headphone device arranged to provide active noise control, for several reasons. Particularly, such devices are dependent on passive noise control, and a vent may typically impair the passive noise control because it allows the noise to propagate much easier through the headphone to the ear canal.

Furthermore, the addition of a vent introduces a Helmholtz resonance when the device is worn. A Helmholtz resonance is a resonance phenomenon which may occur when a cavity, e.g. the ear canal, is acoustically coupled to a surrounding environment by a port or a neck, e.g. a vent. If any air or air mass in the neck is set in motion, the pressure inside the cavity will be affected and act as a restoring force on the air mass in the neck. As such, when set in motion, the air mass in the neck may reciprocate with a natural frequency, which may then be understood as a characteristic frequency of the Helmholtz resonance of the system.

An in-ear device with a vent may thus introduce a Helmholtz resonance with a characteristic frequency, often at a very inconvenient frequency in the audible range, e.g. around 1 kHz, in the ear canal of a user, when the device is worn. Consequently, the user will experience an undesired amplification of sounds at this characteristic frequency. An in-ear headphone device arranged to provide active noise control, may not be able to properly provide active noise control at this characteristic frequency.

Furthermore, acoustic reproduction of a desired audio signal, e.g. music or telecommunication, may be substantially distorted by the presence of an acoustic Helmholtz resonance in a frequency range near the characteristic frequency of the Helmholtz resonance.

Additionally, a vent arranged to reduce the occlusion effect by letting low frequency noise escape from the ear canal, will also allow sound in the bass frequency regime of a desired audio signal, e.g. music, to leave the ear canal. Consequently, the acoustic reproduction of a desired audio signal in the bass frequency regime is degraded. Often the tiny loudspeakers usable in in-ear headphone devices already have much less than ideal bass reproduction capability and are not able to reproduce the bass at an amplified level to counteract the bass-degrading effect of a vent.

Other problems of in-ear headphone devices are associated with the varying shape and size of different outer ears of different users. The ear canal of one user may for example have a volume different from the ear canal of another user. Furthermore, whenever an in-ear headphone device is inserted into the ear of a user, it may not be inserted at the exact same position every time. These varying conditions may be referred to as user variance and may for example influence the performance of an in-ear headphone device in the bass frequency regime.

User variance influences the inward total transfer function $H_{TI}$. Since active noise control depends on the magnitude of this transfer function, it is challenging to provide active noise control, which is perceived optimally for any user, each time the in-ear headphone device is worn. Active noise control further relies on the phase of the inward total transfer function $H_{TI}$, which may also be affected by user variance leading to further distortion. Adaptive filters are used, but if the inward total transfer function $H_{TI}$ is changing fast or much the adaptive filters may not be able to follow the changes without producing audible artefacts.

A similar variation may occur for the reversed transfer function, i.e. the outward total transfer function $H_{TO}$ may vary between users and each time the in-ear headphone device is worn. As a result, it is challenging to properly address loudspeaker feedback, since the efficiency with which sound from the loudspeaker reaches the microphone is unpredictable due to user variance.

Furthermore, due to user variance, the acoustic reproduction of a desired audio signal in the bass frequency regime is degraded.

Further problems of in-ear headphone devices are associated with dynamic acoustic leaks. These may particularly occur during user jaw movement, which may typically perturb the approximately airtight partition or acoustic sealing between the ear canal and the external environment. For example, while a user speaks or chews, small air canals, also referred to as leaks, between the headphone tip and the ear canal may continuously open and close, or at least vary the sound propagation properties of the flexible tip.

For in-ear headphone devices arranged to provide active noise control, dynamic acoustic leaks are particularly problematic. Firstly, a dynamic acoustic leak may suddenly let in undesired noise. Secondly, a dynamic acoustic leak may change the magnitude related to the inward total transfer function $H_{TI}$, which may typically distort the active noise control since it relies on this transfer function. Similarly, the outward total transfer function $H_{TO}$ is affected by dynamic acoustic leaks, and consequently, any loudspeaker feedback may also change, resulting in undesirable distortion of the active noise control signal. Additionally, acoustic leaks may strongly influence the group delay related to the inward total transfer function $H_{TI}$, which further distorts active noise control.

Furthermore, since dynamic acoustic leaks affect the transfer efficiency from the ear canal to the external acoustic environment, and thereby from the loudspeaker to the user's ear drum, the reproduction of a desired audio signal, e.g. music, as perceived by a user may also be distorted.

The presented problems in the field of in-ear headphone devices arranged to provide active noise control may thus be summarized:

- The occlusion effect cannot be suppressed without degrading active noise control due to the introduction of a Helmholtz resonance;
- The occlusion effect cannot be suppressed without degrading audio reproduction due to the introduction of a Helmholtz resonance;
- The occlusion effect cannot be suppressed without degrading loudspeaker reproduction of sound, due to sound leaving the device, particularly in the bass frequency range;
- User variance may affect the magnitude of the inward total transfer function $H_{TI}$, distorting active noise control;
- User variance may affect the phase of the inward total transfer function $H_{TI}$, distorting active noise control;
- User variance may affect the outward total transfer function $H_{TO}$, distorting loudspeaker feedback;
- User variance may affect the outward total transfer function $H_{TO}$, distorting reproduction of a desired audio signal, particularly in the bass frequency range;
- Dynamic acoustic leaks may suddenly let in noise, which active noise control cannot suppress;
- Dynamic acoustic leaks may affect the magnitude of the inward total transfer function $H_{TI}$, distorting active noise control;
- Dynamic acoustic leaks may affect the phase of the inward total transfer function $H_{TI}$, distorting active noise control;
- Dynamic acoustic leaks may affect the outward total transfer function $H_{TO}$, distorting loudspeaker feedback; and/or
- Dynamic acoustic leaks may affect the outward total transfer function $H_{TO}$, distorting reproduction of a desired audio signal, particularly in the bass frequency range.

The inventors have conceived a novel and inventive solution to the problems presented above, relating to the field of in-ear headphone devices, particularly in-ear headphone devices arranged to provide active noise control. Comprehensive models of a worn in-ear headphone device and extensive simulations show the feasibility of embodiments of the invention to overcome or reduce one or more of the described problems, preferably several of them in the same device at the same time.

An in-ear headphone device according to the invention comprises a damped vent, comprising one or more vent elements and one or more dampening elements. The damped vent may for example be a vent with a dampening net located at one or both ends of the vent, or a vent configured with integrated damping effect. According to the invention, the damped vent is arranged to couple the ear canal to the external acoustic environment.

The damped vent is according to an embodiment arranged to dampen an acoustic resonance of said one or more vent elements such that a resonance magnitude of said inward vent transfer function $H_{VI}$ of said damped vent in a reference frequency range from 100 Hz to 2 kHz is maximally 3 dB greater than a reference magnitude of said inward vent transfer function $H_{VI}$ in a reference frequency range from 20 Hz to 100 Hz. In other words, the damped vent is arranged to dampen resonance peaks that occur in the frequency range from 100 Hz to 2 kHz.

A vent without damping will as described above, in combination with the enclosed cavity of the ear canal, typically cause a Helmholtz resonance somewhere in this frequency range if the vent is tuned to audio purposes, for example for reducing the occlusion effect. The magnitude of such acoustic resonances will typically be for example 6 dB above a substantially flat magnitude at lower frequencies.

A damped vent according to the present invention allowing a maximum of 3 dB peak in the typical resonance frequency band instead of the natural e.g. 6 dB, thereby at least halves the sound pressure level at the peak of the Helmholtz resonance. In a preferred embodiment the damped vent is critically damped, thereby suppressing peaks to the reference level, leaving a substantially flat frequency response between 20 Hz and the cut-off frequency, e.g. somewhere between 400 Hz and 2 kHz, e.g. 800 Hz or 1 kHz. In an embodiment, the damped vent may even be overdamped, i.e. suppressing peaks further, below the reference magnitude.

A person skilled in acoustics is able to design a damped vent based on the characteristics provided here, by selecting appropriate damping cloth or other damping material to provide inside the vent or at one or both ends thereof, and/or provide geometric features in the vent design, e.g. slits, designed to achieve the damping effect. Examples of vent dimensions and dampening elements are also provided below and in connection with the models for the simulations described with reference to the drawings.

The damped vent aspect of the invention is particularly inventive, since it is highly counterintuitive to couple the ear canal to the external acoustic environment in an in-ear headphone device arranged to provide noise control. A vent in itself may passively suppress the occlusion effect but will reduce the effect of the passive noise control and introduce a Helmholtz resonance. However, by furthermore including a dampening element and performing a clever selection of design parameters, it is possible to substantially improve the performance of an in-ear headphone device, opposite the otherwise expected performance reduction.

To further present the invention, it is beneficial to introduce some further concepts. The damped vent may be characterized by an inward vent transfer function $H_{VI}$ from the external acoustic environment to the ear canal, and an outward vent transfer function $H_{VO}$ from the ear canal to the external acoustic environment. Dynamic acoustic leaks may be characterized by an inward leak transfer function $H_{LI}$ from the external acoustic environment to the ear canal, and an outward leak transfer function $H_{LO}$ from the ear canal to the external acoustic environment.

Furthermore, if the noise microphone is arranged to primarily record sound from the external acoustic environment, the in-ear headphone device may comprise an electroacoustic path, for example comprising the noise microphone, the signal processor, and the loudspeaker. This electroacoustic path may be characterized by an inward electroacoustic transfer function $H_{EI}$ from the external acoustic environment to the ear canal.

The inward total transfer function $H_{TI}$ may for example comprise a combination of the inward vent transfer function $H_{VI}$ and the inward leak transfer function $H_{LI}$, whereas the outward total transfer function $H_{TO}$ may comprise a combination of the outward vent transfer function $H_{VO}$ and the outward leak transfer function $H_{LO}$.

In the following, arguments are presented explaining why a damped vent may not be a disadvantage for an in-ear headphone device but may unexpectedly in fact yield numerous improvements of such a device.

A concern related to a adding a damped vent to an in-ear headphone device arranged to provide active noise control may be that the damped vent may let additional noise into the ear canal of the user. However, since the inward vent transfer function $H_{VI}$ may typically be well defined and well known, this additional noise is thus straightforward for the active noise control to suppress.

The addition of an undamped vent to an in-ear headphone device may suppress the occlusion effect when the device is worn but results in a Helmholtz resonance. By further adding a dampening element to the vent, the Helmholtz resonance, as well as the related distortions it may generate, can be removed.

As such, the occlusion effect can be suppressed without degrading active noise control and audio reproduction, due to the presence of a Helmholtz resonance. Furthermore, the addition of a vent may typically degrade the reproduction of sound, due to sound leaving the device, particularly in the bass frequency range. However, a dampening element will reduce this effect and provide improved sound reproduction particularly in the bass frequency range, compared to a device without a dampening element.

By implementing a damped vent, several problems related to user variance may also be addressed.

Active noise control may typically be arranged to suppress audible frequencies up to frequencies on the order of 1 kHz. At these frequencies, user variance may significantly influence the total inward transfer function $H_{TI}$, both for in-ear headphone devices without a vent and devices with an undamped vent. The influence of user variance on the total inward transfer function $H_{TI}$ in a device with a damped vent is significantly reduced at the relevant frequencies.

In a similar manner, the outward total transfer function $H_{TO}$ is affected less by user variance in an in-ear headphone device with a damped vent, and loudspeaker feedback may thus generate less distortions. The outward total transfer function $H_{TO}$ does also affect reproduction of a desired audio signal in the ear canal, particularly in the bass frequency range, and a damped vent improve the audio reproduction in this frequency range.

A damped vent is particularly efficient in solving problems related to dynamic leaks. In typical in-ear headphone devices without a damped vent, any sound suddenly entering the ear canal through an occurring dynamic acoustic leak may be heard very prominently by the user. In comparison, in typical embodiments of the invention, noise may enter through both the damped vent and dynamic acoustic leaks. Since the damped vent has a predictable inward vent transfer function $H_{VI}$, noise entering through the damped vent is easily suppressed. Importantly, any sound entering the ear canal through dynamic acoustic leaks may exit again through the damped vent. As such, according to embodiments of the invention, sounds of dynamic acoustic leaks are heard far less prominently by the user, compared to sounds leaking into an ear canal without being able to exit through a vent.

For in-ear headphone devices with active noise control without a vent, dynamic acoustic leaks may strongly alter the inward total transfer function $H_{TI}$ as the leak transfer function is the predominant part of the total transfer function in this case. This relates both to the magnitude and the phase of the inward total transfer function $H_{TI}$. Consequently, dynamic acoustic leaks may continuously alter the inward total transfer function $H_{TI}$, generating distortions of the active noise control, resulting in audible artefacts. For typical embodiments according to the invention, the damped vent ensures that the inward total transfer function $H_{TI}$ varies far less in the occurrence of dynamic acoustic leaks because the inward vent transfer function $H_{VI}$ forms a typically predominant part of the inward total transfer function $H_{TI}$, resulting in a significantly reduced amount of variations, thereby a reduction of audible artefacts due to adaptation mismatch.

In a similar manner, the outward total transfer function $H_{TO}$ is affected less by dynamic acoustic leaks in an in-ear headphone device with a damped vent, and loudspeaker feedback may thus generate further less distortions. The outward total transfer function $H_{TO}$ does additionally affect reproduction of a desired audio signal in the ear canal, particularly in the bass frequency range, and a damped vent improves the audio reproduction in this frequency range.

To summarize the presented advantages and solutions, the inventors have identified and solved numerous problems in the field of in-ear headphone devices arranged to provide active noise control according to the invention. Solving these problems is generally based on the inventiveness of a novel, damped vent, which is carefully tailored to both allow a substantial acoustical coupling between ear canal and surrounding environment, while eliminating undesired resonance effects, such as a Helmholtz resonance. Consequently, an in-ear headphone device according to embodiments of the invention may

- suppress the occlusion effect without degrading active noise control due to the introduction of a time-varying Helmholtz resonance;
- suppress the occlusion effect without degrading audio reproduction due to the introduction of a time-varying Helmholtz resonance;
- suppress the occlusion effect while minimally degrading loudspeaker reproduction of sound, due to sound leaving the device, particularly in the bass frequency range;
- reduce distortion due to user variance influencing the magnitude of the inward total transfer function $H_{TI}$;
- reduce distortion due to user variance influencing the phase of the inward total transfer function $H_{TI}$;
- reduce distortion from loudspeaker feedback due to user variance influencing the outward total transfer function $H_{TO}$;
- improve loudspeaker reproduction of sound, particularly in the bass frequency range, due to a reduced influence of user variance on the transfer function from loudspeaker to the ear drum, relating to the outward total transfer function $H_{TO}$;
- reduce effects of sound entering the ear canal via dynamic acoustic leaks by allowing them to exit through the damped vent;
- reduce distortion due to dynamic acoustic leaks influencing the magnitude of the inward total transfer function $H_{TI}$;
- reduce distortion due to dynamic acoustic leaks influencing the phase of the inward total transfer function $H_{TI}$;
- reduce distortion from loudspeaker feedback due to dynamic acoustic leaks influencing the outward total transfer function $H_{TO}$; and/or
- improve loudspeaker reproduction of sound, particularly in the bass frequency range, due to a reduced influence of dynamic acoustic leaks on the transfer function from loudspeaker to the ear drum, relating to the outward total transfer function $H_{TO}$.

Compared to both a closed design and a design with an undamped vent, an active noise control filter in an embodiment of the present invention with a damped vent, arranged to model the inward and outward transfer functions may have smoother amplitude and phase characteristics and may change less when an algorithm such as LMS is used for adapting to changes in leakage or ear canal placement.

Compared to an acoustic design where the loudspeaker and the vent shares a common volume before reaching the ear-canal, the disclosed arrangement has the advantage that less of the sound from the loudspeaker is transmitted to the external facing microphone, especially at frequencies above the vent cutoff.

In an embodiment said inward vent transfer function $H_{VI}$ and said acoustic resonance are properties of said damped vent when said in-ear headphone device is inserted in an ear-canal of said person.

The acoustical properties of in-ear headphone devices changes depending on the environment in which they are assessed. In the present disclosure, the acoustical properties are considered for the inserted device, i.e. when the loudspeaker and one end of the damped vent is coupled to a closed ear canal cavity, and the other end of the damped vent opens to an external acoustic environment, specifically the concha. Thereby the acoustic resonance is for example considered as a result of an interaction between a tube coupling a closed cavity to an open space.

In an embodiment said loudspeaker and said damped vent are acoustically separated inside said in-ear headphone device.

In some embodiments, the loudspeaker and damped vent are preferably not directly to a common chamber or duct or the like, thereby not having a common exit to the ear canal from the headphone device.

In an embodiment said loudspeaker and said damped vent are acoustically separated by a dampening element inside said in-ear headphone device.

In some embodiments, the loudspeaker and the damped vent are acoustically separated or partitioned by a dampening element.

In an embodiment said loudspeaker and said damped vent are coupled to said ear canal by individual ducts.

Thereby the loudspeaker sound is primarily delivered to the ear canal, compared to an embodiment where loudspeaker and vent are combined inside the device with a common duct to the ear canal, where more of the sound will exit to the external environment through the vent instead of reaching the ear drum.

In an embodiment said damped vent is arranged with a cross-sectional area equivalent to a cylinder with diameter in a range from 1.5 mm to 3.5 mm, such as from 2.0 mm to 3.0 mm, for example 2.3 mm or 2.5 mm.

Preferred cross-sectional areas for the damped vent may for example be in the range from 1.8 $mm^2$ to 9.6 $mm^2$, such as from 3.1 $mm^2$ to 7.1 $mm^2$, for example 4.2 $mm^2$ or 4.9 $mm^2$. The damped vent may have various cross-sectional shapes, such as circular, rectangular, semi-circular, etc., and may have varying cross-sectional area along its length, or be combined by two or more vents, split vents, etc., but may preferably be designed with dimensions that are equivalent to the above-stated dimensions of a cylindrical vent.

In an embodiment said damped vent is arranged with a length equivalent to a cylinder with length in a range from 2.5 mm to 10 mm, such as from 3.5 mm to 9 mm, such as from 4.5 mm to 8 mm, for example 5 mm or 7 mm.

The damped vent may have various shapes along its length, and may be straight, curved or bend, etc., and may be combined by two or more vents, split vents, etc., but may preferably be designed with dimensions that are equivalent to the above-stated dimensions of a cylindrical vent.

In an embodiment said vent may be characterized by an acoustic mass based on said cross-sectional area and said length of said damped vent, wherein a combination of said acoustic mass and a typical effective volume of said ear canal may be characterized by a vent cut-off frequency selected in the range from 500 Hz to 2000 Hz, such as from 650 Hz to 1600 Hz, such as from 700 Hz to 1200 Hz, for example 800 Hz, 900 Hz, or 1000 Hz.

Acoustic mass may also be understood acoustic inertia and may describe the reluctance of a body of air to change its velocity. For example, in an embodiment of the invention, the body of air in a damped vent may have an acoustic mass determined by the length and cross-sectional area of the damped vent. The acoustic mass in combination with a typical effective volume of an ear canal may be characterized by a vent cut-off frequency. A typical effective volume of an ear canal may for example be understood as a remaining volume of an ear canal when the device is inserted in the ear canal of an average or a typical user.

In an embodiment said noise microphone is arranged to primarily record sound from said external acoustic environment.

Advantages of recording sound for the acoustic noise control from the external acoustic environment is that the noise can be measured with minimum influence of the sound present in the ear canal, which may include desired sound reproduced by the headphone device such as music playback or telephone conversation. A feedback from the internal loudspeaker to the externally directed microphone may be measured and accounted for in the processing. Further, an externally directed noise microphone may advantageously be used for the dual purpose of recording noise to cancel as well as desired environmental sound to not be cancelled, maybe even enhanced, for example voice conversation, announcements or desired warning sounds. Some degree of directionality for e.g. voice conversation may be achieved by mounting the microphone accordingly, or by using several microphones or microphone ports at different locations on the headphone device. The differentiation between sound to cancel and sound to not cancel, possibly even enhance, may be based on a simple crossover filter with a crossover frequency at for example around 800-1000 Hz, or be based on more advanced algorithms, e.g. signal content differentiation techniques, e.g. detecting and preserving or enhancing voice features in the recorded sound, and creating an active noise control signal based on the rest of the recorded signal. The dual-purpose noise microphone may also be used to record the user's own voice, for example for telecommunication or digital assistant purposes.

In an embodiment said noise microphone is arranged to primarily record sound from said ear canal.

By using the sound in the ear canal as input to the active noise control, i.e. recording by a noise microphone directed to the ear canal, the active noise control algorithm receives direct feedback regarding the performance of the active noise control signal actually reproduced in the ear canal. Thereby adjustments to the active noise control signal may be faster and/or more accurate. Desired sound reproduced by the headphone device itself, e.g. music playback or telephone conversation, may be subtracted from the feedback signal before applying it as error signal to the active noise control algorithm. Also desired environmental sound such as voice conversations, announcements, etc., may be preserved to a certain extend by a crossover filter, or other signal content differentiation techniques, e.g. voice feature extraction.

In an embodiment said in-ear headphone device comprise an auxiliary microphone.

Various embodiments may utilize several microphones for various purposes. An auxiliary microphone located at the opposite of the noise microphone, i.e. directed to the ear canal when the noise microphone is arranged to primarily record environmental sound, or directed to the environment when the noise microphone is arranged to primarily record ear canal sound, may aid the signal processor in the tasks where the noise microphone is less advantageous. For example, an auxiliary microphone directed to the ear canal may provide an error signal for an active noise control algorithm based on an environmentally directed noise microphone, and vice versa. Further, the auxiliary microphone may be used to record the voice of the user for telecommunication and digital assistant purposes. A combination of noise microphone and auxiliary microphone may further be used to measure the transfer functions between the environment and ear canal or vice versa. Further, several environmental directed microphones located at different locations around the headphone device may improve directionality of the sound recording, e.g. for improved differentiation between desired conversation voice and background noise.

In an embodiment a microphone arranged to primarily record sound from said ear canal is coupled to said ear canal via an individual microphone duct.

A microphone directed to the ear canal, whether being the noise microphone or an auxiliary microphone, may preferably be coupled to the ear canal via an individual microphone duct, whereby the microphone takes up less space in the ear canal, and is not directly coupled to chambers or ducts of the loudspeaker or damped vent. By means of the microphone duct, the microphone receives the mix of sound that is present in the ear canal, as only affected by the predictable transfer function of the microphone duct.

In an embodiment a microphone is acoustically coupled to said ear canal via said damped vent.

In some embodiments of the invention, a microphone, e.g. the noise microphone, may record sound directly from the damped vent. Depending on the positioning of one or more dampening elements, the microphone may then either primarily record sound from the external environment, from the ear canal, or record a balanced mixture of sound from the external environment and the ear canal.

In an embodiment said signal processor provides said active noise control signal on the basis of an estimated inward total transfer function $H_{TI}$.

Basically, the active noise control algorithm is arranged to reproduce a sound opposite of the noise that remains after propagating to the ear canal from the environment through the damped vent, the dynamic acoustic leak, the electro-acoustic path if present, etc., i.e. as represented by the inward total transfer function $H_{TI}$. Therefore, it is advantageous, particularly with an environmental facing noise microphone, to base the active noise control signal on an estimation on this transfer function. The inward total transfer function $H_{TI}$ may be estimated at design or manufacturing time and stored as a predefined function in the headphone device and used as a starting point. However, the headphone device is preferably arranged to update the transfer function to adapt to varying dynamic acoustic leaks, varying user ear canal characteristics, etc. Some of the possibilities for estimating, i.e. adapting, the inward total transfer function $H_{TI}$ during use are described above.

In an embodiment said estimated inward total transfer function $H_{TI}$ is based on an estimation of said inward vent transfer function $H_{VI}$.

As described above, the inward vent transfer function $H_{VI}$ forms a predominant and fairly predictable part of the inward total transfer function $H_{TI}$. As the inward vent transfer function $H_{VI}$ may be estimated based on models of the substantially fixed damped vent or measurements by the designer or manufacturer, a qualified estimation of the inward total transfer function $H_{TI}$ may therefore be based on the estimation of the inward vent transfer function $H_{VI}$, possibly taking into account an averaged or guessed model for the inward leak transfer function $H_{LI}$ of the dynamic acoustic leak.

In an embodiment said estimated inward total transfer function $H_{TI}$ is based on a difference of recordings of sound of said external acoustic environment and said ear canal, respectively.

When microphones are available both for primarily environmental sound as well as primarily ear canal sound, e.g. by having arranged the noise microphone towards the environment and an auxiliary error microphone toward the ear canal, or having arranged the noise microphone towards the ear canal and an auxiliary microphone for telecommunication, digital assistants and/or enhanced conversation voice towards the environment, a comparison of the sound they record may be used to determine an estimation of the inward total transfer function $H_{TI}$.

In an embodiment said estimated inward total transfer function $H_{TI}$ is based on an estimated outward total transfer function $H_{TO}$.

When the outward total transfer function $H_{TO}$ is known or estimated, it may be converted, e.g. its poles and zeroes, to find an estimate of the inward total transfer function $H_{TI}$, i.e. the opposite direction, which can be used to improve the active noise control.

In an embodiment said estimated outward total transfer function $H_{TO}$ is based on a difference of sound reproduced by said loudspeaker and sound recorded by said noise microphone.

When the noise microphone, or an auxiliary microphone, is located to primarily record noise of the external environment, it will also record the feedback of sound from the loudspeaker escaping out through the vent, leak and headphone in general. By comparing the loudspeaker output with the outside microphone input, an estimation of the outward total transfer function $H_{TO}$ can be determined. This is advantageous by itself, as it allows for the signal processor to control the undesired speaker to microphone feedback to avoid in the worst case e.g. whistling or squealing. Further, the measured or estimated outward total transfer function $H_{TO}$ may be used to determine the inward total transfer function $H_{TI}$ to improve the active noise control as described above. Hence, estimation or measurement of the outward total transfer function $H_{TO}$ may be used in the active noise control, as well as in active feedback control.

In an embodiment said signal processor is arranged with an active noise control algorithm to provide said active noise control signal, the active noise control algorithm for example being of an LMS algorithm type, such as filtered-x LMS or direction search LMS, and being characterised by a step size.

Various suitable active noise control algorithms are available to the person skilled in the field of headphone devices with active noise control. In principle, the active noise control algorithm comprises an adaptive filter which is continuously updated to generate a sound that is as opposite to the undesired noise as possible. As active noise control is typically not applied to higher frequencies, a typical sample rate of the recorded noise signal may be for example 2 kHz, thereby allowing active noise control for noise below 1 kHz. Other frequency ranges for active noise control are available to the skilled person, with suitable adjustments of other frequency ranges accordingly, for example tuning of the damped vent characteristic frequencies, etc.

A relevant parameter of different active noise control algorithms is the step size, which determines how much the adaptive filter is changed by each algorithm iteration. Smaller step sizes allow for more accurate adaptation to the measured noise, whereas larger step sizes allow for keeping track of large and quick changes of the undesired noise. If the step size is selected too small by aiming for an increased accuracy, the adaptive noise filter in a headphone without a damped vent, where the leak is the most significant part of the inward total transfer function $H_{TI}$, will not be able to track the large change in noise characteristics that results from for example a variation in the dynamic acoustic leak occurring when the user chews or speaks. This may lead to audible artefacts each time the noise characteristics or transfer functions are changed significantly. If, on the other hand, the step size is selected too large by aiming at quick adaption to significant changes in the transfer function, the adaptive filter will tend to exceed each correction and oscillate around the optimal filter settings. This may lead to audible artefacts or less noise suppression during stable conditions where noise and transfer functions only vary smoothly over time. With some active noise control algorithms, it may be possible to increase the frequency of algorithm iteration, to allow using smaller step sizes while still finding the optimal filter settings as quickly as with larger step sizes. In an example, a doubling of processing frequency may allow half step size, without reducing the response of the algorithm to significant changes. However, increasing processing frequency requires more expensive processors and auxiliary components, and consumes more battery. In other words, a trade-off exists to a certain degree between filter adaptation performance, processing speed, costs and battery consumption.

By embodiments of the present invention, the stability of the inward total transfer function $H_{TI}$ may be improved because a significant part of it relies on the inward vent transfer function $H_{VI}$ which is substantially fixed and rather predictable over time, compared to the unpredictable and dynamic inward leak transfer function $H_{LI}$. With the more stable inward total transfer function $H_{TI}$ the degree of adaptation required by the active noise control algorithm and adaptive filters is reduced, compared to a headphone without a damped vent. This benefit can be used for various purposes according to different interests. An advantageous embodiment utilizes the improved transfer function stability to reduce the step size, whereby more accurate noise control is achieved during stable conditions without reducing the tracking performance in dynamic conditions because the dynamic conditions are less dynamic with the stable transfer function due to the damped vent. Another advantageous embodiment utilizes the improved transfer function stability to reduce the processing requirement, e.g. using cheaper components and/or slower processing frequency, again without reducing the tracking performance in dynamic conditions because the dynamic conditions are less dynamic with the stable transfer function due to the damped vent. Other combinations among the parameters of the above-mentioned trade-offs are also suitable and advantageous embodiments of the invention.

Generally, active noise control may be causal or acausal. In causal active noise control, the microphone is typically located closer to a noise source than the loudspeaker such that a sound wave segment recorded at the noise microphone may be processed in time for the loudspeaker to reproduce an active noise control signal arranged to cancel the recorded sound wave segment in the ear canal.

In acausal active noise control, a sound wave segment recorded at the noise microphone may not be processed in time to cancel that same sound wave segment in the ear canal. Instead, acausal active noise control rely on recorded sound to predict future noise in the ear canal. Even in embodiments where causal active noise control is possible, the active noise control may in some embodiments also benefit from including a component of prediction of future noise, i.e. how the receive sound will develop, in order to pre-adjust the algorithm in the right direction.

In an embodiment where the noise microphone is arranged to primarily record sound from the ear canal, the active noise control may typically be acausal active noise control. As such, active occlusion control may typically be a type of acausal active noise control.

Acausal and causal active noise control require different signal processing procedures. Signal processing for acausal active noise control may typically rely on a larger degree of prediction, since it relies on predicting future noise.

Embodiments of the invention are typically characterized by at better predictability than devices without a damped vent. For example, the total inward transfer function is less susceptible to dynamic acoustic leaks. Therefore, embodiments of the invention may also provide improved acausal active noise control, or combination of causal and acausal active noise control.

In an embodiment said in-ear headphone device is arranged with a crossover frequency, voice extraction functionality or other separation means between the sounds that are desired to undergo active noise control, and the sounds that are desired to be heard unaffected or even enhanced.

For some applications of an in-ear headphone device the active noise control, or full employment of active noise control, may be undesired. This may for example be in embodiments where the environments sounds may sometimes be desired for the user to hear, e.g. for conversation, announcements, orientation in traffic, etc. A suitable crossover frequency, e.g. at around 800 Hz-1 kHz, or employment of voice extraction functionality or other separation means may allow different processing of sounds such as noise that are desired to undergo active noise control, and sounds such as voice that are desired to be heard unaffected or even enhanced. The separation means may advantageously be user-configurable and/or be able to switch on or off as needed.

In an embodiment said in-ear headphone device is arranged with an option to switch said active noise control signal on or off, adjust its frequency range or mode of noise being controlled.

In some embodiments it may be desirable to provide a user-selectable active noise control, so that the user can switch it off when not relevant or even undesired, for example in some of the situations mentioned above. In an embodiment, the settings of the active noise control algorithm may be directly or indirectly user-configurable, by allowing the user to select a frequency range of noise control, a degree of noise suppression, select between large or small step size for quick tracking or accurate stable condition, etc., or by allowing the user to select a noise control mode, e.g. select between quiet or noisy environment, stable or dynamic usage, requirement of hearing environmental voice simultaneous with the noise control or desiring as much sound suppression as possible, etc.

In an embodiment said estimated inward total transfer function $H_{TI}$ comprises a time-varying inward transfer function component comprising an inward leak transfer function $H_{LI}$, and a static inward transfer function component comprising said inward vent transfer function $H_{VI}$.

As described above, the inward total transfer function $H_{TI}$ in a headphone device comprising both a damped vent and an unavoidable dynamic acoustic leak, includes at least a preferably predominant, substantially stable and predictable contribution from the damped vent, and a preferably minor, time-varying and unstable contribution from the dynamic acoustic leak. An advantageous embodiment therefore comprises an estimated inward total transfer function $H_{TI}$ having at least those two components. In some embodiments the components are measured, estimated or modelled separately and can thereby be distinguished and adjusted individually in the inward total transfer function $H_{TI}$. In other embodiments, the inward total transfer function $H_{TI}$ is measured, estimated or modelled in a way that does not allow distinguishing of the two components, but does nevertheless comprises those two components, although inseparably.

In an embodiment said signal processor is arranged to update a representation of said estimated inward total transfer function $H_{TI}$, preferably recurringly, recurrently, or continuously, for example at an active noise control sample rate or algorithm iteration rate, for example in a range from 800 to 4000 times per second, for example from 1200 to 3000 times per second, such as 2000 times per second.

An adaptive active noise control filter representing the inward total transfer function $H_{TI}$ as acknowledged by the skilled person, is preferably updated continuously to track smooth as well as heavy changes of noise characteristics or transfer functions. However, compared to headphone devices without a damped vent, the algorithm step size, e.g. step size of an LMS algorithm, may in embodiments of the present invention be reduced without increasing the algorithm iteration rate or otherwise increasing the processing requirements.

In an embodiment said signal processor is arranged to update said representation of said estimated inward total transfer function $H_{TI}$ at an algorithm step size, for example an LMS algorithm step size.

The adaptive active noise control filter is preferably updated as described above in steps determined by a predetermined, yet configurable, step size selected to achieve a suitable trade-off between accurate tracking and fast tracking of noise characteristics and transfer functions, where audible artefacts are reduced as much as possible. However, compared to headphone devices without a damped vent, the algorithm step size, e.g. step size of an LMS algorithm, may in embodiments of the present invention be reduced without increasing the tracking time or the audible artefacts.

In an embodiment said signal processer is arranged to provide an active occlusion control signal and said loudspeaker is arranged to reproduce said active occlusion control signal in said ear canal.

In an embodiment said active occlusion control signal is based on a signal recorded from a microphone arranged to primarily record sound from said ear canal, for example said noise microphone arranged to primarily record sound from said ear canal.

Embodiments of the invention are preferentially arranged to suppress the occlusion effect but might not eliminate the occlusion effect fully. Therefore, some embodiments of the invention are arranged to provide active occlusion control. Here, a microphone may typically record sound, e.g. occlusion, from the ear canal, and based on this recording, a processor may generate an active occlusion control signal, which the loudspeaker may reproduce in the ear canal to further suppress the occlusion effect.

The overall procedure for active occlusion control is similar to the procedure for active noise control, particularly if a noise microphone is arranged to primarily record sound from the ear canal. In some embodiments of the invention, the active noise control signal may also be interpreted as an active occlusion control signal.

In an embodiments where the noise microphone is arranged to primarily record sound from the ear canal, the active noise control may typically be acausal active noise control. As such, active occlusion control may typically be a type of acausal active noise control, and thereby require a larger degree of predictability, since it relies on predicting future noise. As embodiments of the invention with the damped vent are typically characterized by at better predictability than devices without a damped vent, the total inward transfer function is less susceptible to dynamic acoustic leaks. Therefore, embodiments of the invention may also provide improved acausal active noise control, for example improved active occlusion control.

In an embodiment said resonance magnitude is any magnitude of said inward vent transfer function $H_{VT}$ in said range from 100 Hz to 2 kHz.

The damped vent of the present invention is preferably arranged to not allow magnitudes above 3 dB greater than the reference magnitude in the 100 Hz-2 kHz band, regardless of the origin of the magnitude. In other words, magnitude peaks that appear in undamped vents at the above-mentioned frequency range are within the scope of the present invention whether they are directly, indirectly or not caused by resonance phenomena. In a preferred embodiment, a damped vent is provided for which the inward vent transfer function $H_{VT}$ is substantially flat, i.e. without peaks above 3 dB over reference magnitude, preferably all the way from 20 Hz to 2 kHz, but at least from 100 Hz to 2 kHz. The reference magnitude of the transfer function is typically 0 dB. In some embodiments, the dampening elements are further arranged to provide a nominal attenuation of the reference band for example in the range from 2 dB to 10 dB, such as from 2 dB to 6 dB, for example from 3 dB to 4 dB. In such embodiments, the damped vent is arranged to not allow a magnitude in the frequency range from 100 Hz to 2 kHz larger than 3 dB above the nominal attenuation.

In an embodiment said resonance magnitude is a magnitude of said inward vent transfer function $H_{VT}$ at 800 Hz.

A damped vent achieving a damping of the resonances to reduce the resonance magnitude to not more than 3 dB greater magnitude at 800 Hz than a reference magnitude between 20 Hz and 100 Hz, is highly advantageous, as the frequency range around 800 Hz is particularly relevant in headphone and active noise control applications.

In an embodiment said resonance magnitude is maximally 2 dB, such as maximally 1 dB, for example maximally 0 dB, greater than said reference magnitude.

In preferred embodiments, the resonance magnitude is reduced as much as possible towards 0 dB relative to the reference magnitude. In an embodiment, the damped vent may even be overdamped, i.e. suppressing peaks further, below the reference magnitude.

In an embodiment said reference magnitude is based on an average magnitude of said inward vent transfer function $H_{VT}$ in a range from 20 Hz to 100 Hz, such as from 20 Hz to 60 Hz or from 60 Hz to 100 Hz.

The frequency response of the inward vent transfer function $H_{VT}$ is typically substantially flat in these frequency ranges, with an average magnitude typically around 0 dB. In some embodiments, the dampening elements are further arranged to provide a nominal attenuation of the reference band for example in the range from 2 dB to 10 dB, such as from 2 dB to 6 dB, for example from 3 dB to 4 dB. In such embodiments, the damped vent is arranged to not allow a magnitude in the frequency range from 100 Hz to 2 kHz larger than 3 dB above the nominal attenuation.

In an embodiment said dampening elements are arranged to provide a nominal attenuation in the range from 2 dB to 10 dB, such as from 2 dB to 6 dB, for example from 3 dB to 4 dB in a frequency band from 50 Hz to 500 Hz, e.g. at 500 Hz.

The nominal attenuation is preferably a broad-band attenuation, lowering the reference magnitude of by for example 3-4 dB. In such embodiment, the damped vent is preferably arranged to dampen the acoustic resonance magnitude to not exceed 3 dB above the nominal attenuated reference magnitude. For example in an embodiment, the damped vent attenuates all audible frequencies nominally by around 3-4 dB, but further attenuates a resonance peak that would otherwise be 6 dB above reference by further at least 3 dB, thus achieving for example a generally flat response in the passband at between −3 dB and −4 dB, with the resonance peak not exceeding 0 dB, and more preferably being attenuated to a critical dampened state.

By an embodiment of the present invention the resulting sound pressure level (SPL) in the ear canal is optimized for increased speech intelligibility. When speech is presented at very low levels, it is difficult to understand because important speech cues are not audible, which makes it hard to discriminate phonemes. As the level is increased, speech recognition increases until at some point recognition starts to deteriorate with increasing level. This phenomenon is often referred to as 'the rollover' effect. In cocktail party situations, the overall environmental SPL is usually above the rollover point. According to an embodiment, the acoustically attenuating damped vent applies a nominal attenuation, thereby increasing the intelligibility of loud speech, or speech in noisy environments.

An advantageous feature of embodiments of the present invention is the passive processing of bass, whereby frequencies below the low pass cut-off frequency are attenuated acoustically. Many conventional noise-suppressing algorithms (including adaptive microphone directional patterns) exhibit substantial gains in SNR. However, they often fail to deliver better speech recognition scores in practical tests, because these algorithms are prone to produce 'glitches' or unnatural sounds that attract the user's attention thereby reducing focus on or even masking the speech to be recognized. This is avoided by including the nominal attenuation of the present embodiment.

Embodiments of present invention may be advantageous by facilitating prolonged stay in noisy or otherwise loud environments by applying a slight general or nominal attenuation. For example, a general attenuation of 3 dB may reduce the noise exposure by 50%, or alternatively allow the wearer to stay twice as long in a situation for the ears to be subjected to the same noise exposure as would be the case without the system.

To further increase protection against exposure to loud sounds, embodiments may be advantageous to include means for limiting the peak SPL delivered to the ear canal. This may be done acoustically in the damped vent, e.g. by narrow slots in the vent.

In an embodiment said inward vent transfer function $H_{VI}$, in the range from 20 Hz to 10 kHz, is characterized by having a low-pass characteristic wherein any magnitudes of said inward vent transfer function $H_{VI}$ from a low-pass cut-off frequency to 10 kHz is at least 3 dB lower than said reference magnitude.

The cut-off frequency is usually defined as the frequency where the magnitude falls below 3 dB under the magnitude of the pass band, here referred to as the reference magnitude. Designing the damped vent with a low-pass characteristic from environment to ear canal, i.e. the inward vent transfer function $H_{VI}$, restricts the bandwidth of the characteristics of the damped vent described above to the frequencies below the cut-off frequency. An advantage of a restricted damped vent bandwidth may for example be attenuation of feedback from the internal loudspeaker to the external microphone at frequencies above the cut-off frequency. For this purpose, the cut-off frequency may advantageously be selected as a trade-off between allowing the most dominating noise, i.e. bass frequencies, to escape the ear canal through the vent, and at the same time attenuating exit of important speech frequencies for improved speech intelligibility and feedback reduction. Another advantage may be to coordinate the active noise control algorithm bandwidth with the low-pass characteristic of the damped vent, as the active noise control algorithm in preferred embodiments is most efficient or possibly only applied to lower frequencies, e.g. up to 1 kHz.

Further, for a user with noise induced hearing loss, this will often be most prominent around 3 kHz due to the resonance of the open ear canal. It is therefore especially advantageous to include a gain reduction mechanism that limits the power transmitted to the ear around 3 kHz.

Further, for embodiments implementing an electroacoustic path with a high-pass characteristic as described below, the low-pass characteristic of the damped vent reduces the acoustic masking of the high frequency band, thereby improving the degree of control and possible SNR achievable by the electroacoustic path. In an embodiment, said low pass cut-off frequency and said high pass cut-off frequency establishes a crossover frequency between said damped vent and said electroacoustic path.

Further, if the electroacoustic path is implemented with a directional microphone assembly of any kind, i.e. one or more directional microphones, or microphones mounted at such locations as to effectively function as directional microphones, such directionality is particularly important for speech intelligibility. By implementing a restricted bandwidth of the damped vent pass band, e.g. up to 800 Hz or 1 kHz, the amount of omnidirectional sound received through the damped vent is reduced, thereby minimizing masking of the directional sound received through the microphones. This may be very advantageous, as the electroacoustic path cannot attenuate the acoustic omnidirectional sound received by the damped vent, but is in more or less full control of the gain and filter of the electroacoustic path. In particular, the directionality is important for the intelligibility of consonants, i.e. the higher end of the speech frequency spectrum, thereby above a preferred cut-off frequency.

In an embodiment said low-pass cut-off frequency is in the range from 400 Hz to 2000 Hz, such as from 500 Hz to 1600 Hz, such as from 600 Hz to 1200 Hz, such as 800 Hz.

In an embodiment said device further comprises an electroacoustic path comprising a microphone primarily recording environment sound, e.g. said noise microphone, a variable gain, and said loudspeaker, wherein said electroacoustic path is arranged to couple said external acoustic environment to said ear canal.

By means of an electroacoustic path from the environment to the ear canal, environmental sound may be processed electronically, for example digitally, and reproduced in the ear canal. In an embodiment, the variable gain is an analog filter and a digital side chain with a gain controller implemented to control the analog filter. In another embodiment, the variable gain is also digital. The processing may have various purposes with different advantages in different embodiments, for example amplifying certain frequency bands and attenuating other, or filtering certain sound features and attenuating other, e.g. for providing sound in the ear canal which is focused to certain sound content, e.g. speech, e.g. to improve speech intelligibility. Further, according to an embodiment, the electroacoustic path may also apply a negative gain to increase intelligibility of speech. The electroacoustic path may also implement peak limiting e.g. electromechanical, such as using thin membranes with limited movement in the loudspeaker and microphone, reducing the electrical gain when loud sounds are detected and/or by emitting a phase reversed replica of a sound to be attenuated via the loudspeaker.

In an embodiment said electroacoustic path is characterized by an inward electro transfer function $H_{EI}$ having a high-pass characteristic having a high-pass cut-off frequency, preferably based on said low-pass cut-off frequency, such as in the range from 400 Hz to 2000 Hz, such as from 500 Hz to 1600 Hz, such as from 600 Hz to 1200 Hz, such as 800 Hz.

The high pass characteristic of the electroacoustic path is preferably essentially flat from the cut-off frequency to at least 5 kHz, such as 7 kHz. In an embodiment, said low pass cut-off frequency and said high pass cut-off frequency establishes a crossover frequency between said damped vent and said electroacoustic path.

Embodiments having both types of paths, i.e. the acoustic damped vent and the electroacoustic path, facilitates establishment of a hybrid transfer function through the combination of the transfer function of the electroacoustic path and the transfer function of the damped vent. An advantageous effect of the combined transfer function is that the control algorithm of the system may focus solely on the controlling of frequencies above the crossover frequency.

In an embodiment said electroacoustic path is arranged to apply a high-pass gain for frequencies above said high-pass cut-off frequency, preferably in the range from −30 dB to 20 dB at 3 kHz, such as in the range from −25 dB to 15 dB at 3 kHz, such as in the range from −20 dB to 10 dB at 3 kHz.

In an embodiment said arranging of said damped vent to dampen said acoustic resonance is obtained by means of said dampening elements.

In other words, it is preferably the dampening elements of the damped vent that causes the damping of the acoustic resonance to reduce the resonance magnitude to not exceed the reference magnitude by more than a few dB as described above.

In an embodiment said one or more vent elements comprise one or more of said one or more dampening elements.

In some embodiments of the invention, any of the one or more dampening elements may be built into one or more vent elements.

In an embodiment said one or more dampening elements comprise a dampening cloth, a dampening net, a dampening foam and/or dampening slits.

A dampening element may have any form or material, as long as it manages to oppose acoustic flow to some degree. A dampening element may be characterized by an acoustical impedance, which measures the opposition that the dampening element exerts on acoustic flow. As such, a dampening element and its acoustical impedance is analogous to a resistor in an electrical circuit and the resistance of the resistor.

In an embodiment said one or more dampening element are characterized by an acoustic impedance, wherein said acoustic impedance is in the range from 20 acoustic ohm to 500 acoustic ohm, such as from 50 acoustic ohm to 400 acoustic ohm, for example 180 acoustic ohm or 200 acoustic ohm.

Acoustic ohms are in CGS units, i.e 1 acoustic ohm=1 dyne·s/cm$^5$, where dyne is a derived unit of force in the CGS system of units.

In an embodiment said in-ear headphone device is battery powered, such as powered by a rechargeable battery.

In an embodiment said in-ear headphone device is arranged to receive an external audio signal, for example through an audio signal interface, wherein said loudspeaker is arranged to reproduce said external audio signal.

In many embodiments, it may be preferable to allow an external audio signal to be provided to the in-ear headphone device, which can be emitted as sound by the loudspeaker. The external audio signal may be provided from an external unit such as an audio source arranged to output an electrical audio signal and with connecting means to deliver the audio signal to the in-ear headphone device. Examples of connecting means are wired connections such as a cabled connection and wireless connections such as a Bluetooth connection, e.g. Bluetooth A2DP or Bluetooth aptX, or a Wi-Fi connection.

In some embodiments, the external audio signal may be processed prior to reproduction by the loudspeaker.

In an embodiment said in-ear headphone device is configured as a true wireless headphone.

Thereby no cables are required for the in-ear headphone, neither to connect to audio sources, nor to connect two in-ear headphones of a set.

In an embodiment said in-ear headphone device is arranged to transmit a signal recorded by a microphone, for example said noise microphone or said auxiliary microphone.

In some embodiments of the invention, it may be advantageous for a microphone to record sound, which can then be transmitted, e.g. for telecommunication purposes. This recording may preferably be performed with a microphone arranged to primarily record sound from an external environment.

The invention further relates to an in-ear headphone device set comprising a first in-ear headphone device and a second in-ear headphone device according to any of the above; wherein said first in-ear headphone device is arranged to be fitted into a first outer ear of a user; and wherein said second in-ear headphone device is arranged to be fitted into a second outer ear of said user.

Many embodiments of the invention comprise a set of two in-ear headphone devices. These may for example be worn by a user in the left and right outer ear respectively. The housings of the two devices of the set may therefore typically be mirrored.

This may ensure noise control for both ears of a user. Furthermore, it allows a user to listen to a desired audio signal in stereo.

In embodiments of the invention, the first in-ear headphone device and the second in-ear headphone device may have different processing, e.g. one of the devices may be a master device, while the other device is a slave device, wherein the master device control the slave device and serves as a communication hub.

In embodiments of the invention, the two in-ear headphone devices are configured to directly or indirectly, e.g. via a common controller, communicate with each other so as to coordinate settings, or to provide improved directional sound processing or active noise control.

THE DRAWINGS

Figure 2:
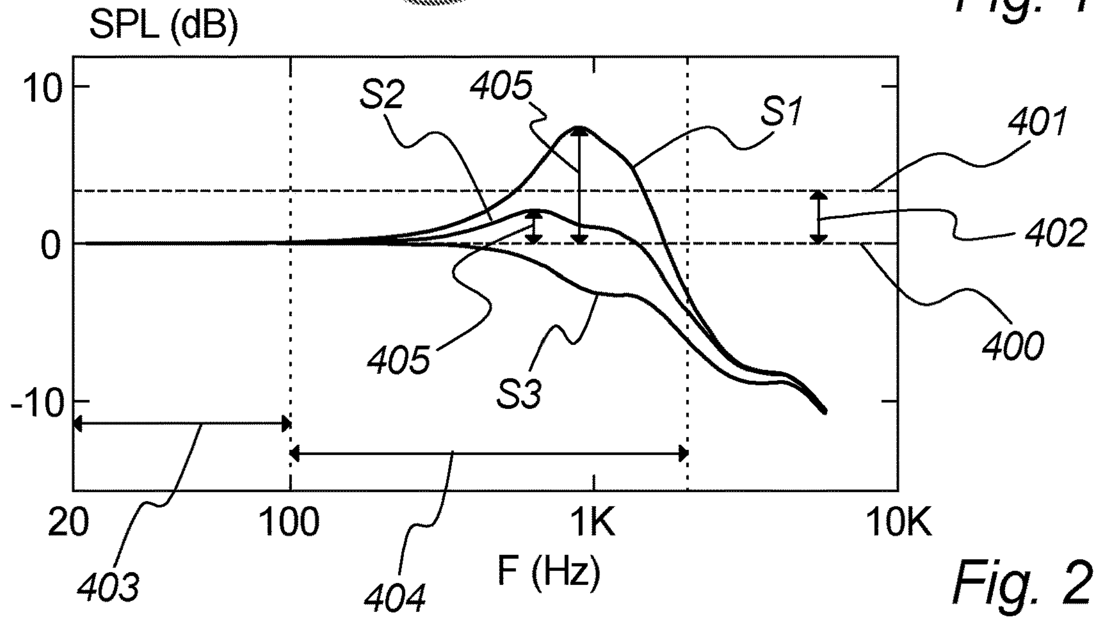
Figure 3A:
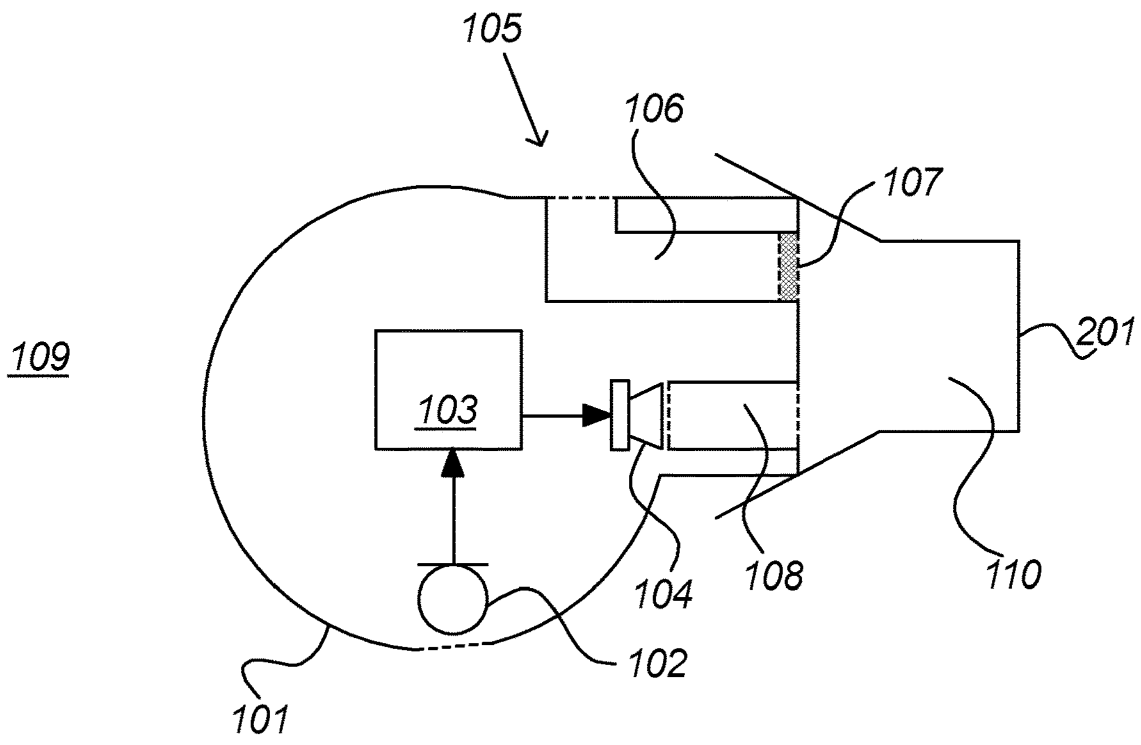
Figure 3B:
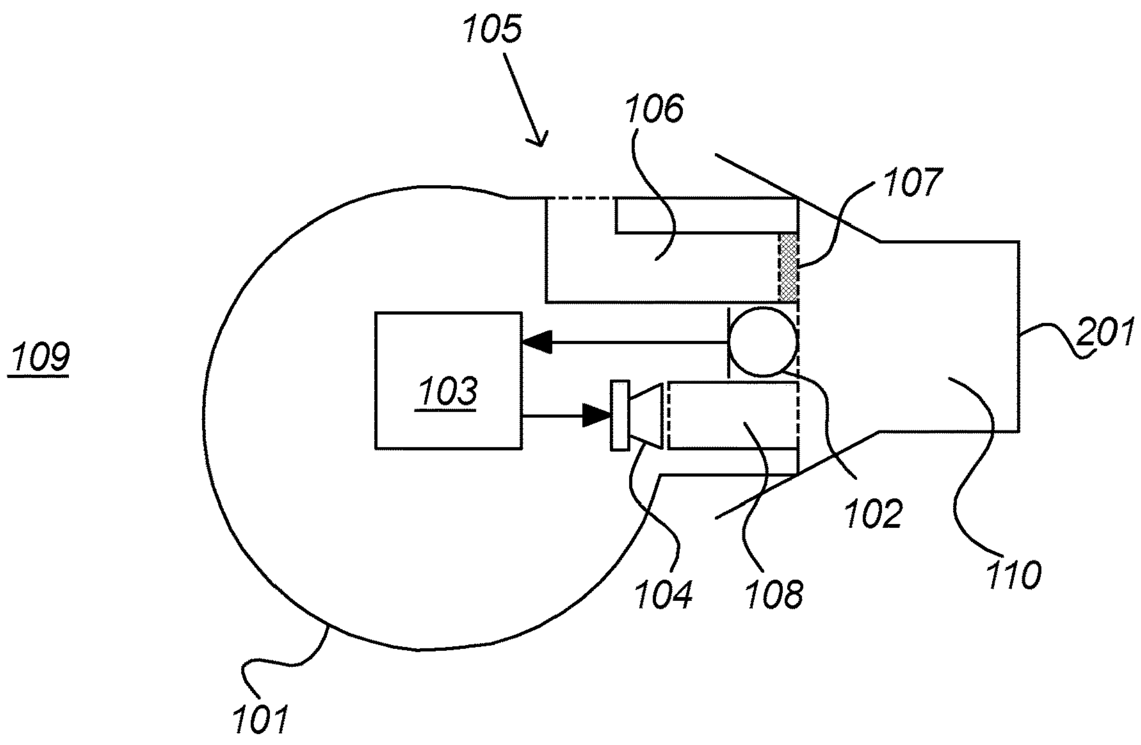
Figure 3C:
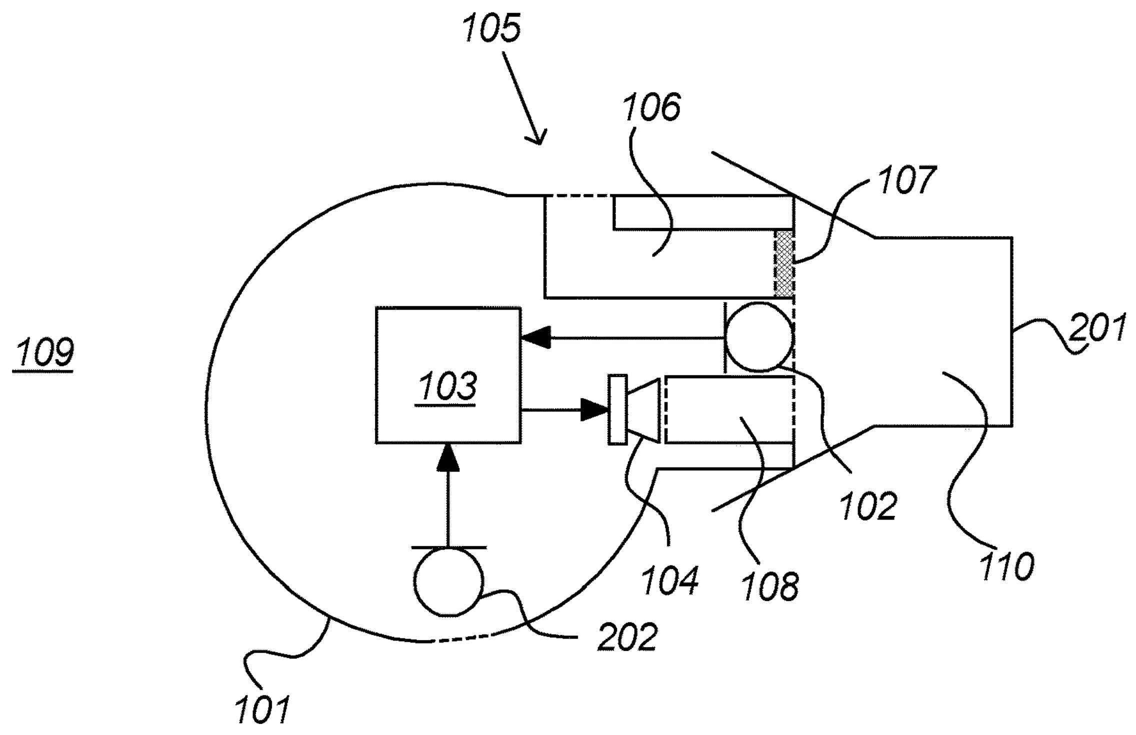
Figure 4:
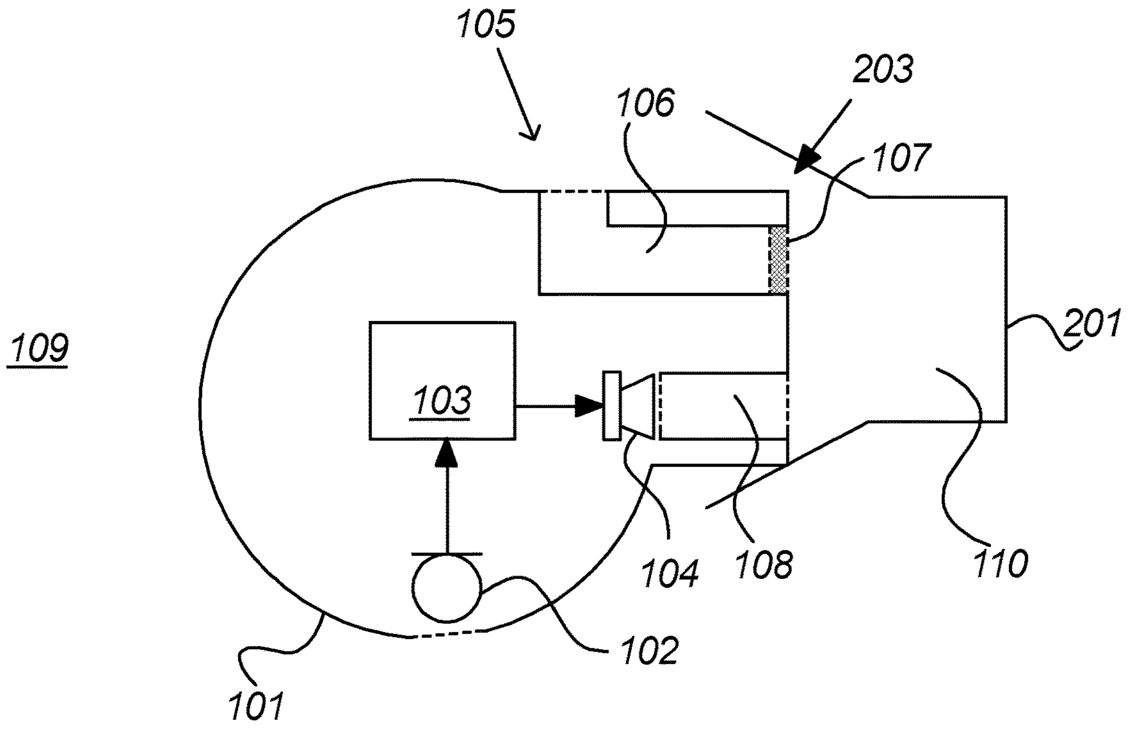
Figure 5A:
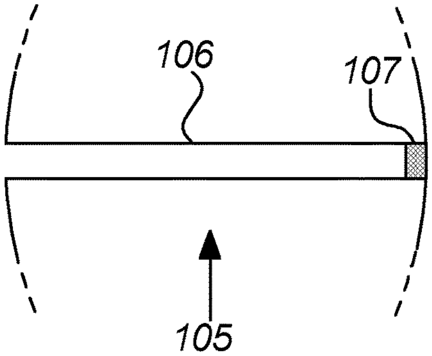
Figure 5B:
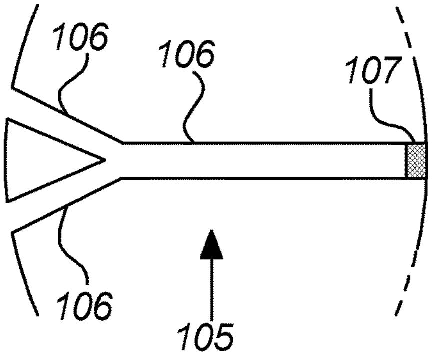
Figure 5C:
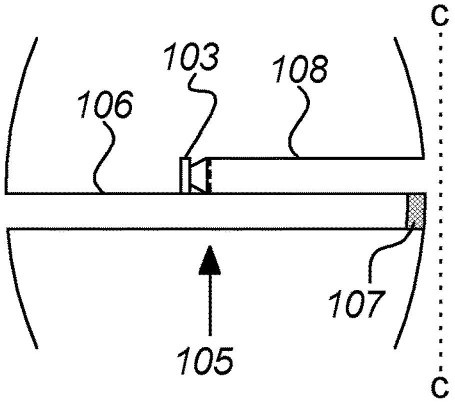
Figure 5E:
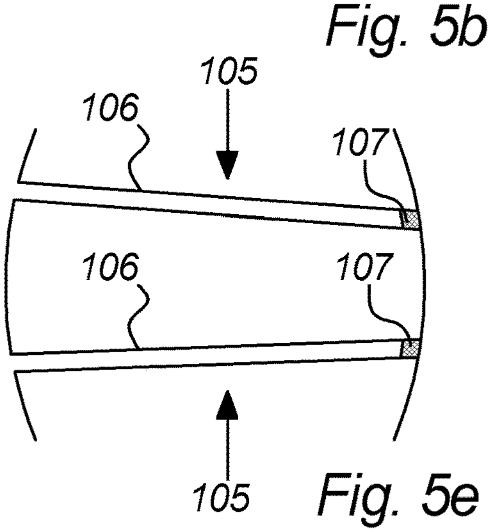
Figure 5D:
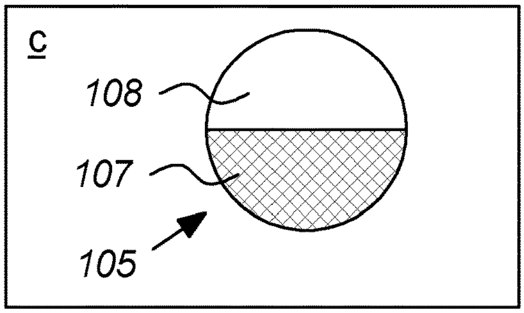
Figure 5F:
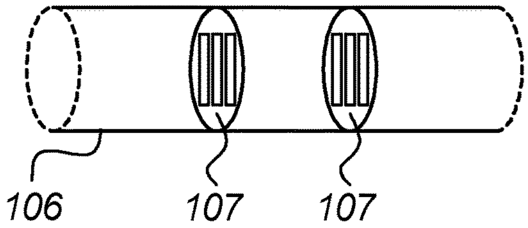
Figure 5G:
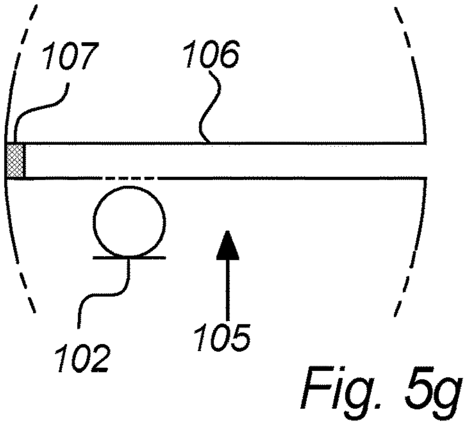
Figure 5H:
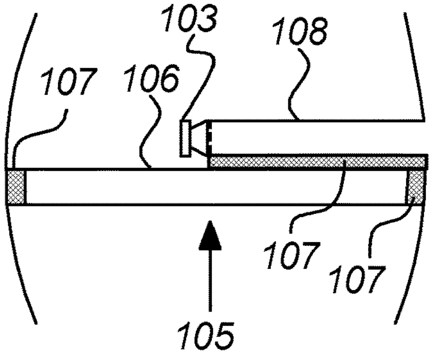
Figure 6A:
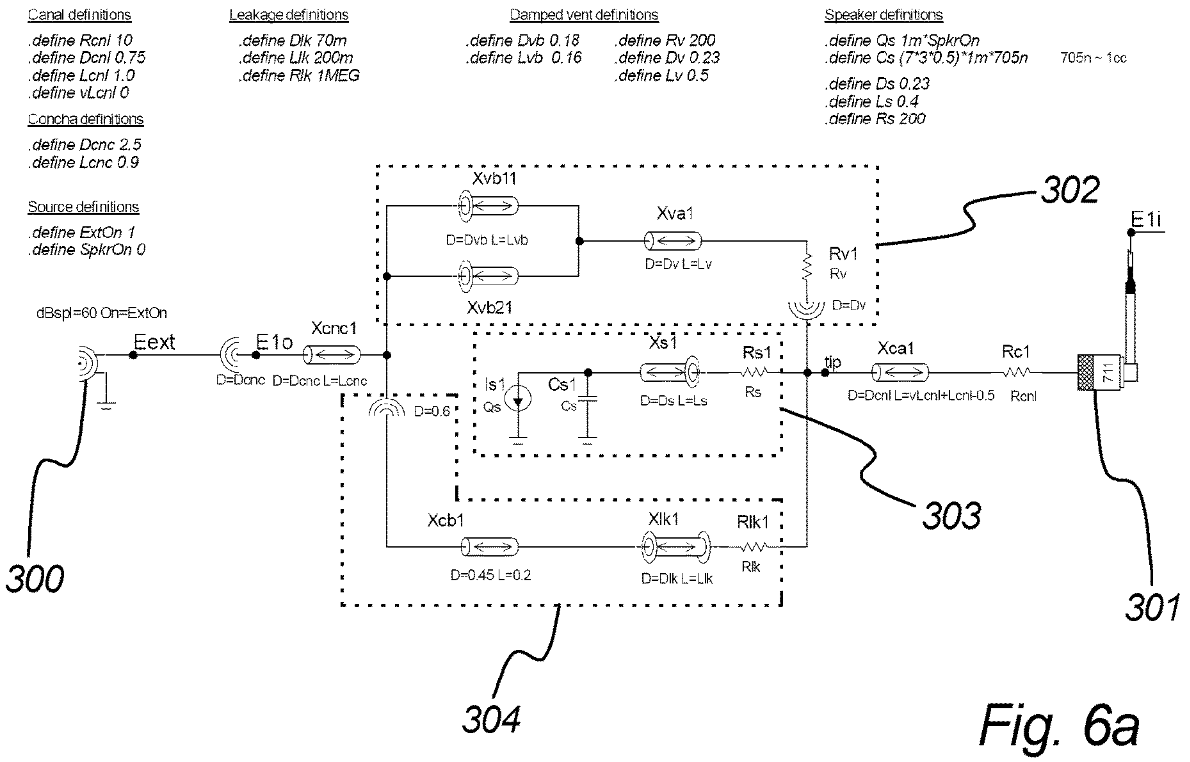
Figure 6B:
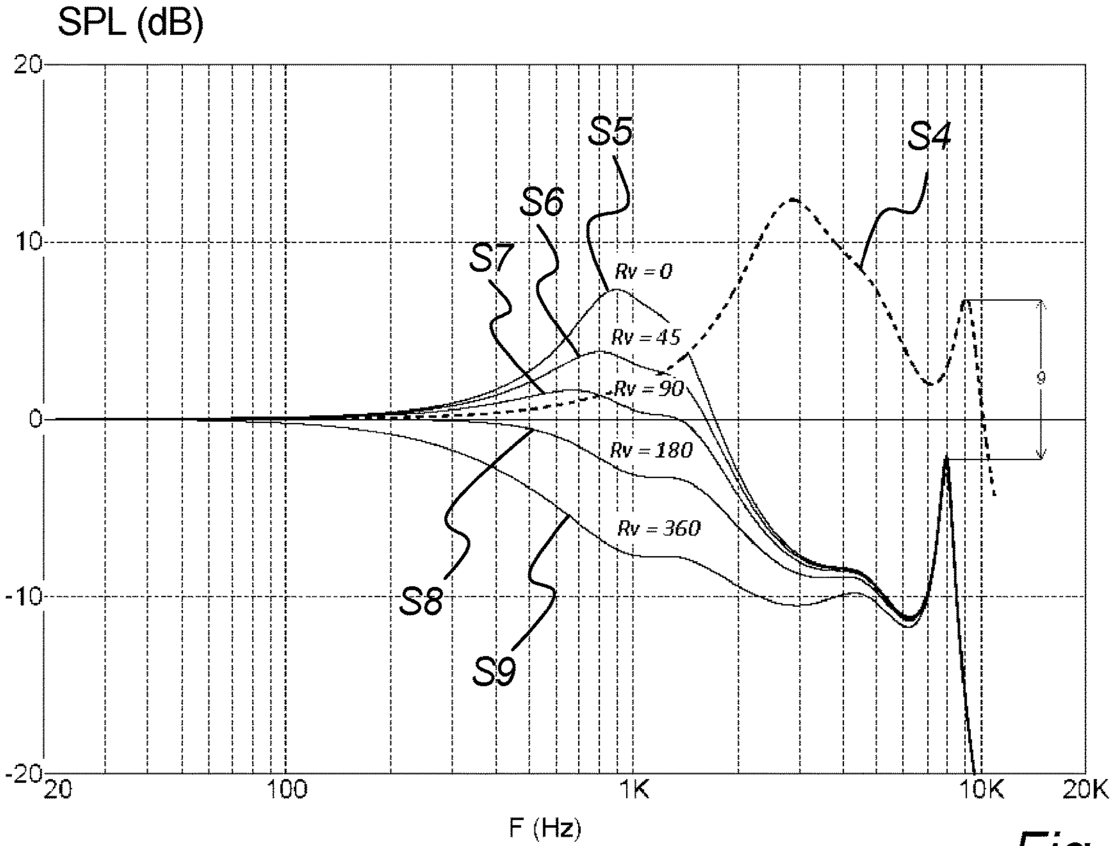
Figure 6C:
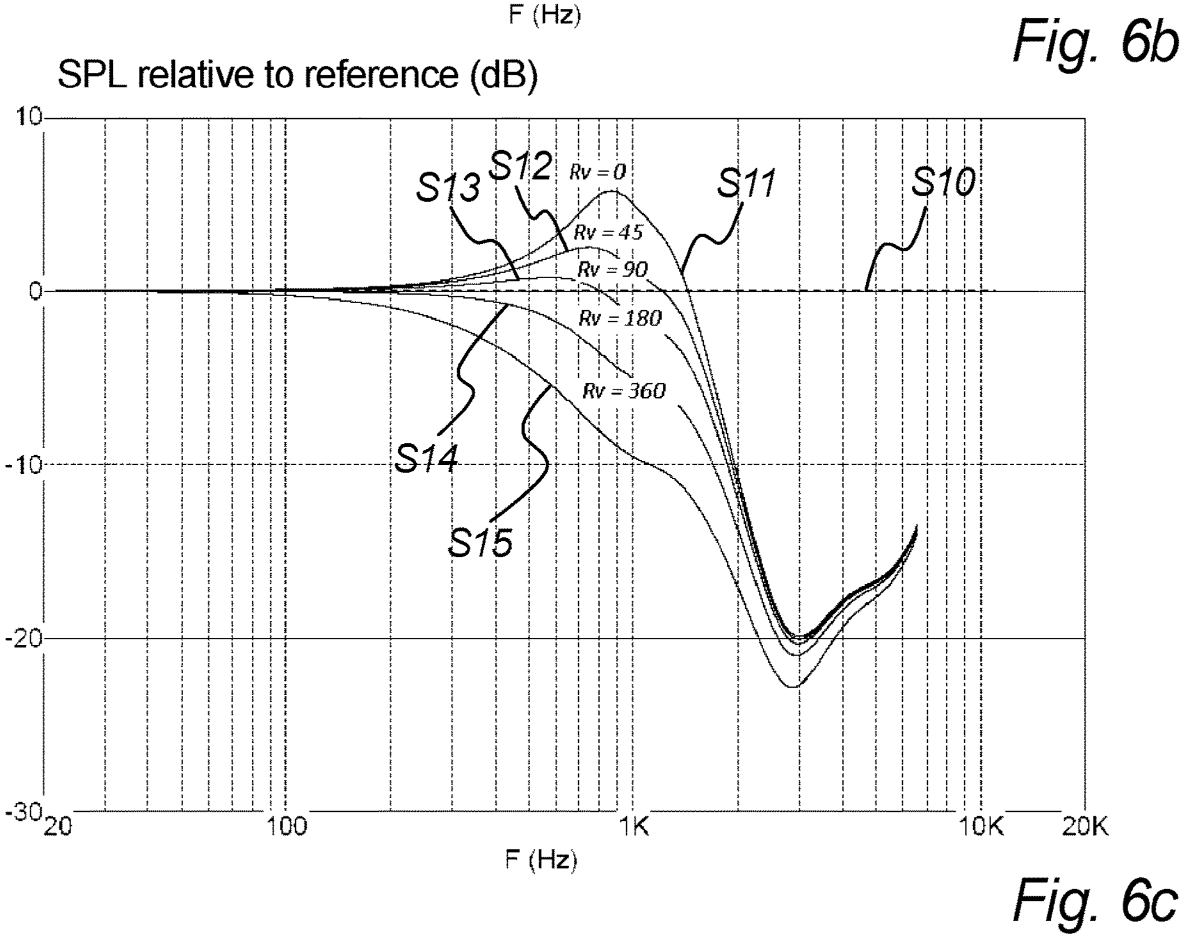
Figure 7A:
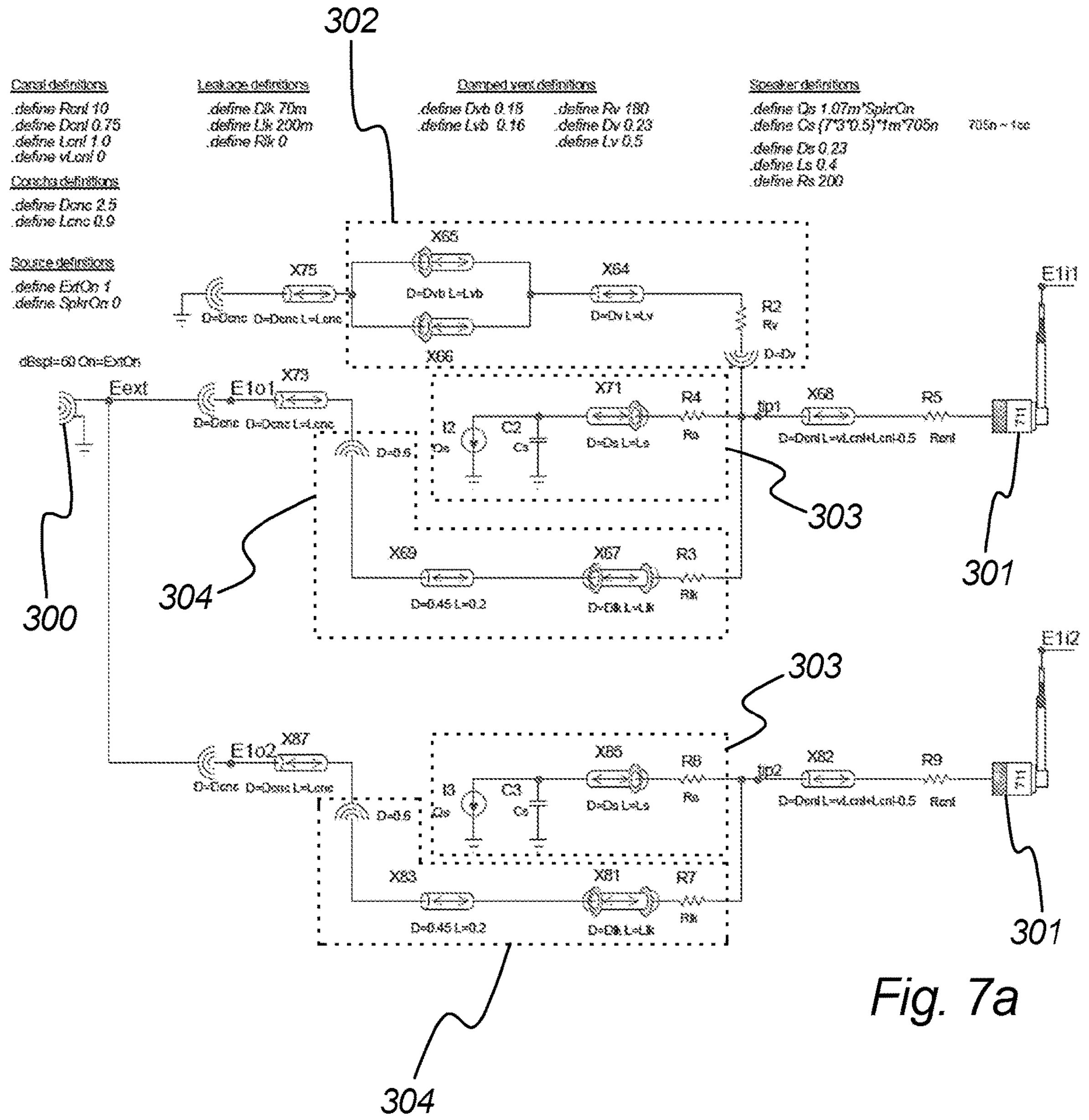
Figure 7B:
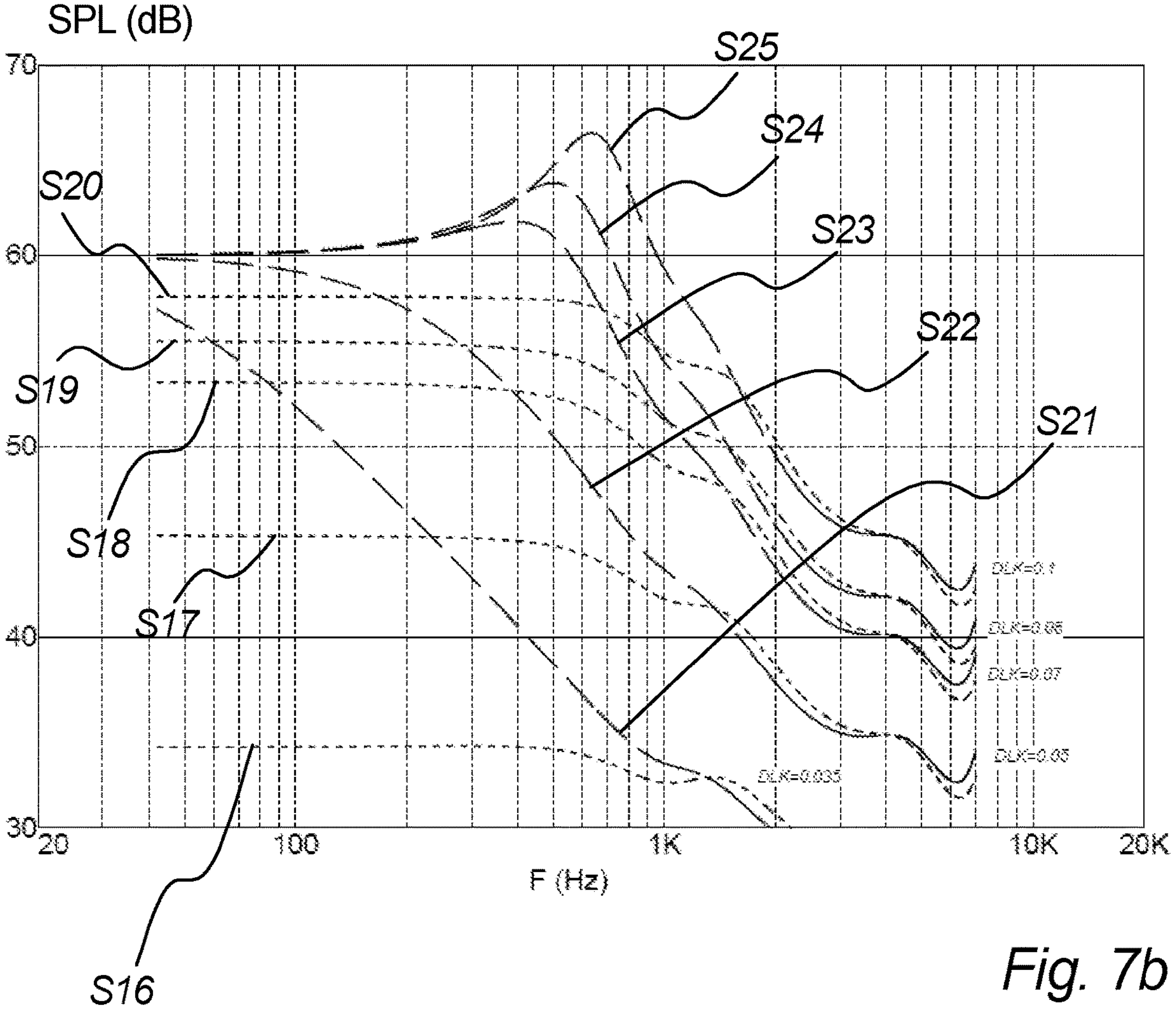
Figure 8A:
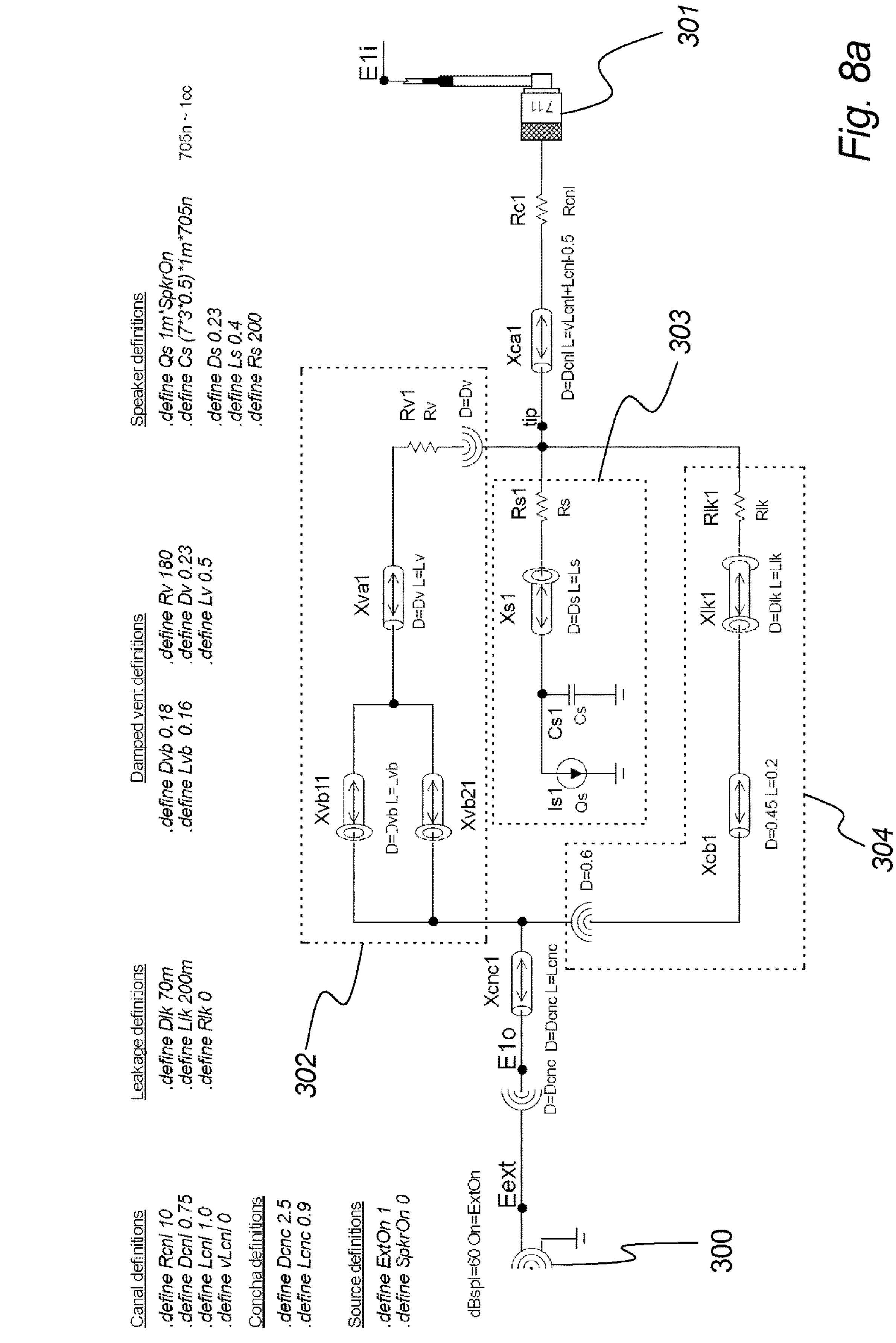
Figure 8B:
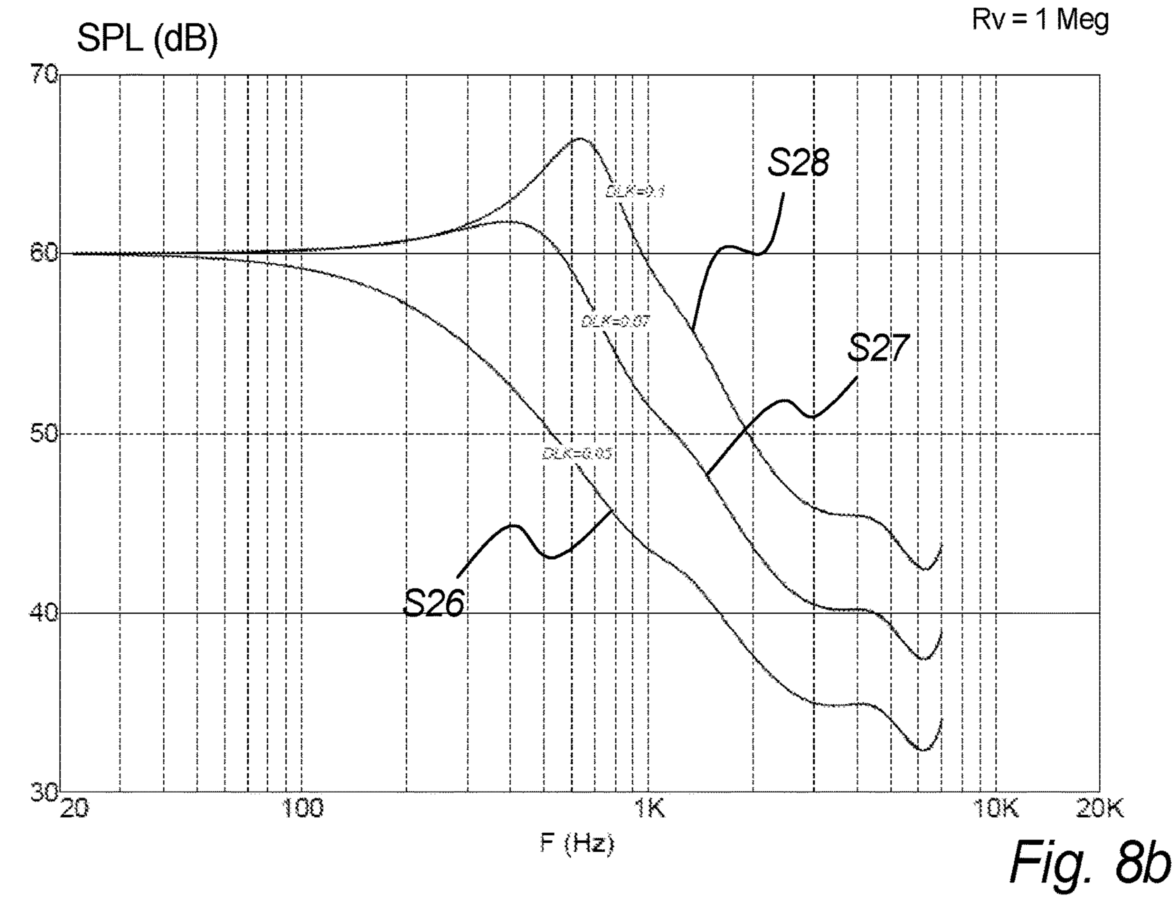
Figure 8C:
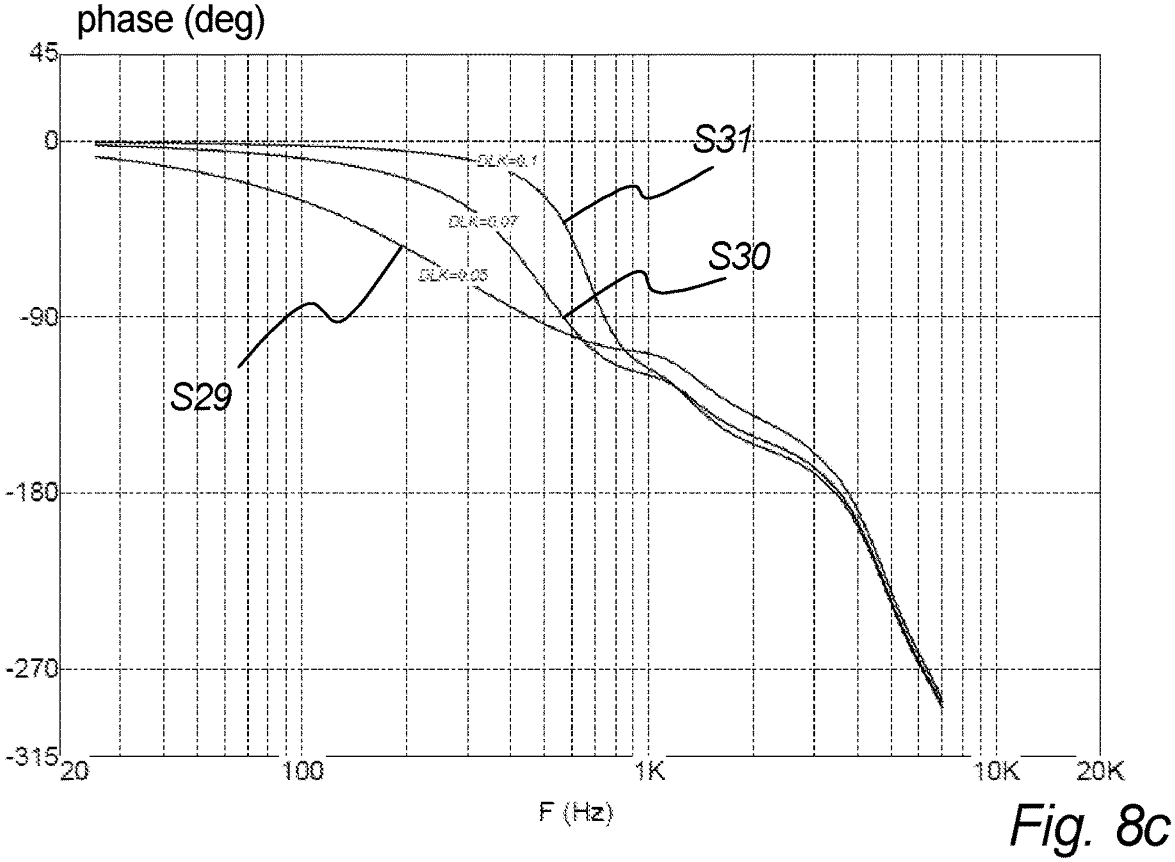
Figure 8D:
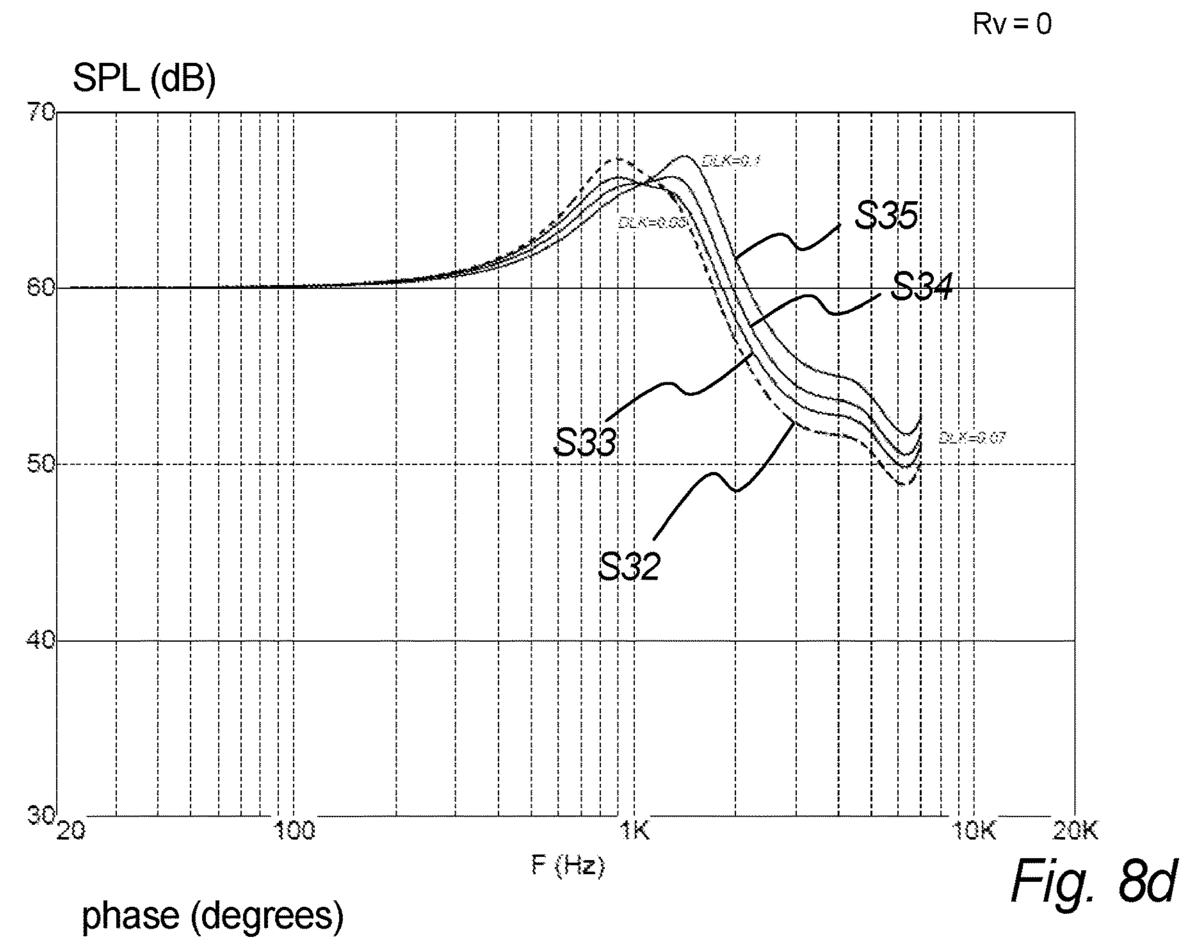
Figure 8E:
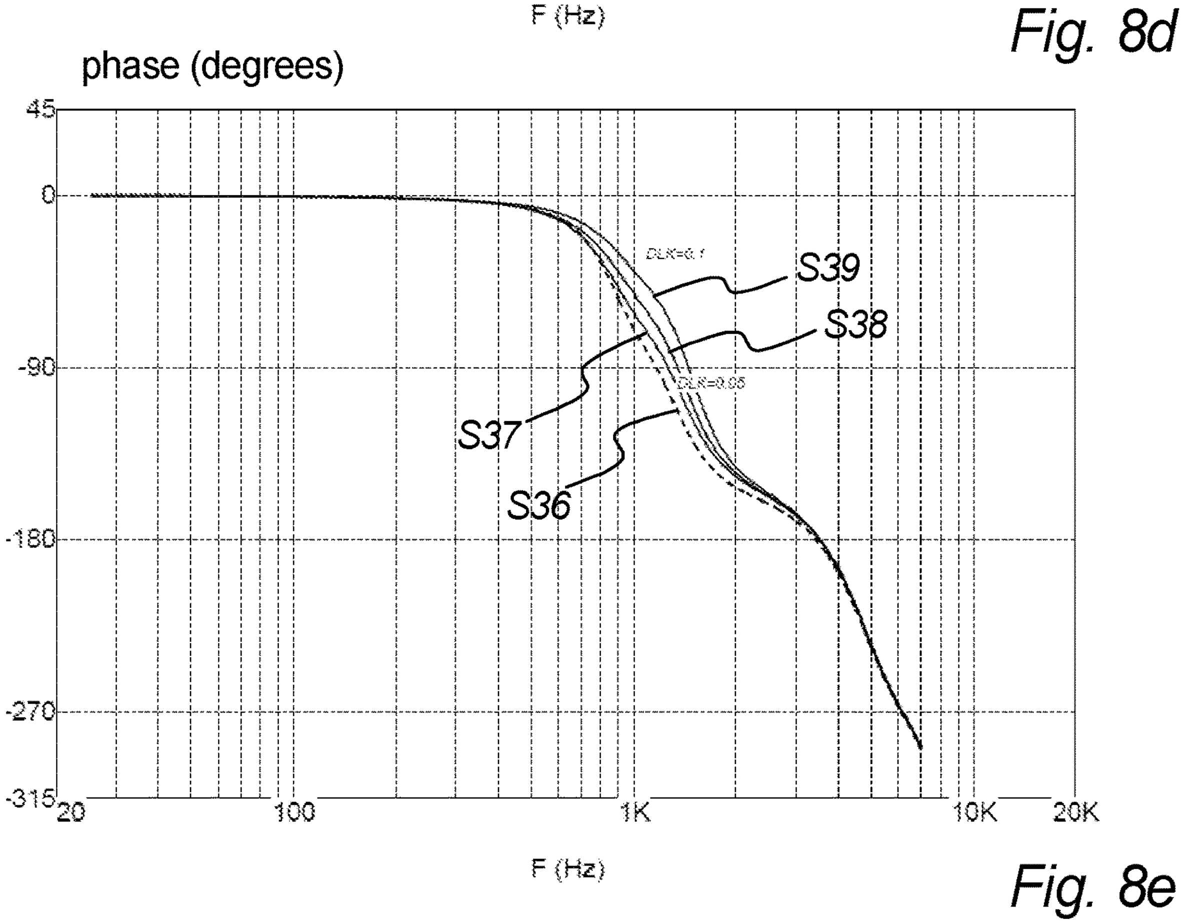
Figure 8F:
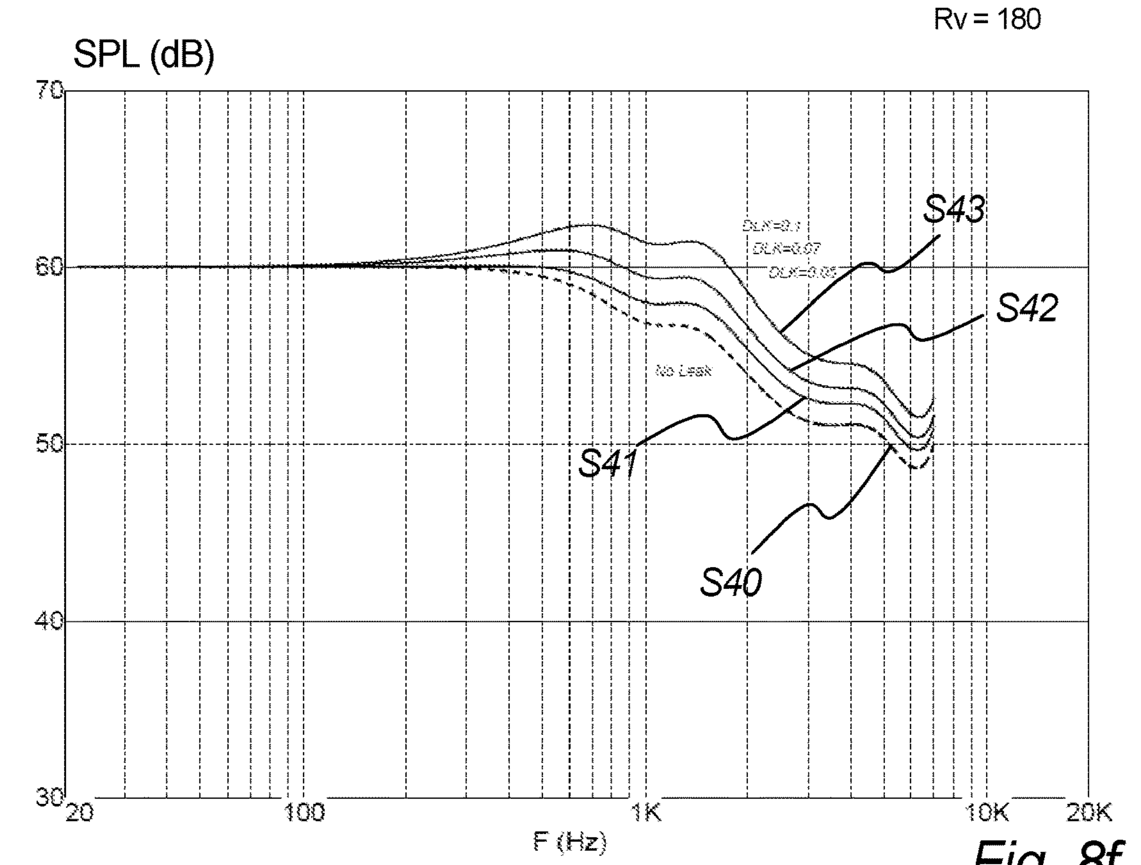
Figure 8G:
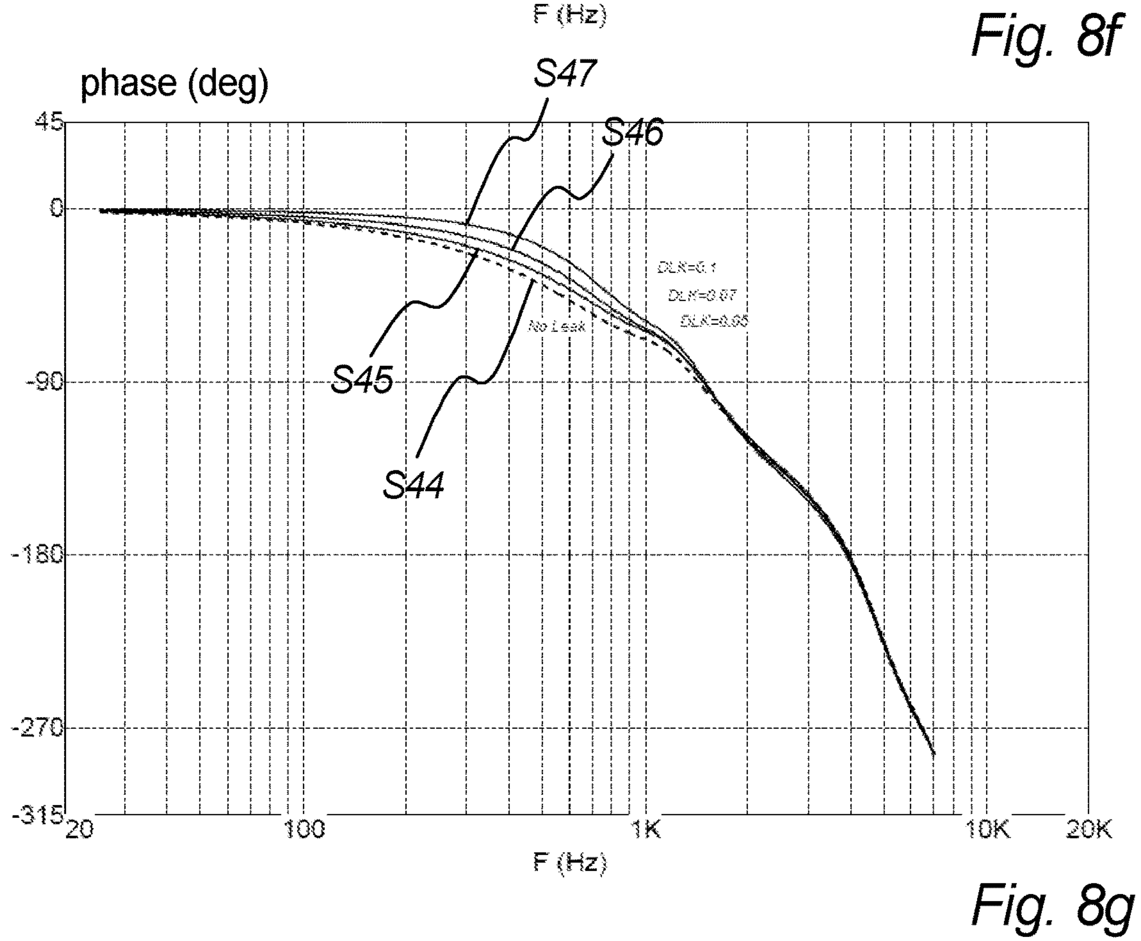
Figure 9A:
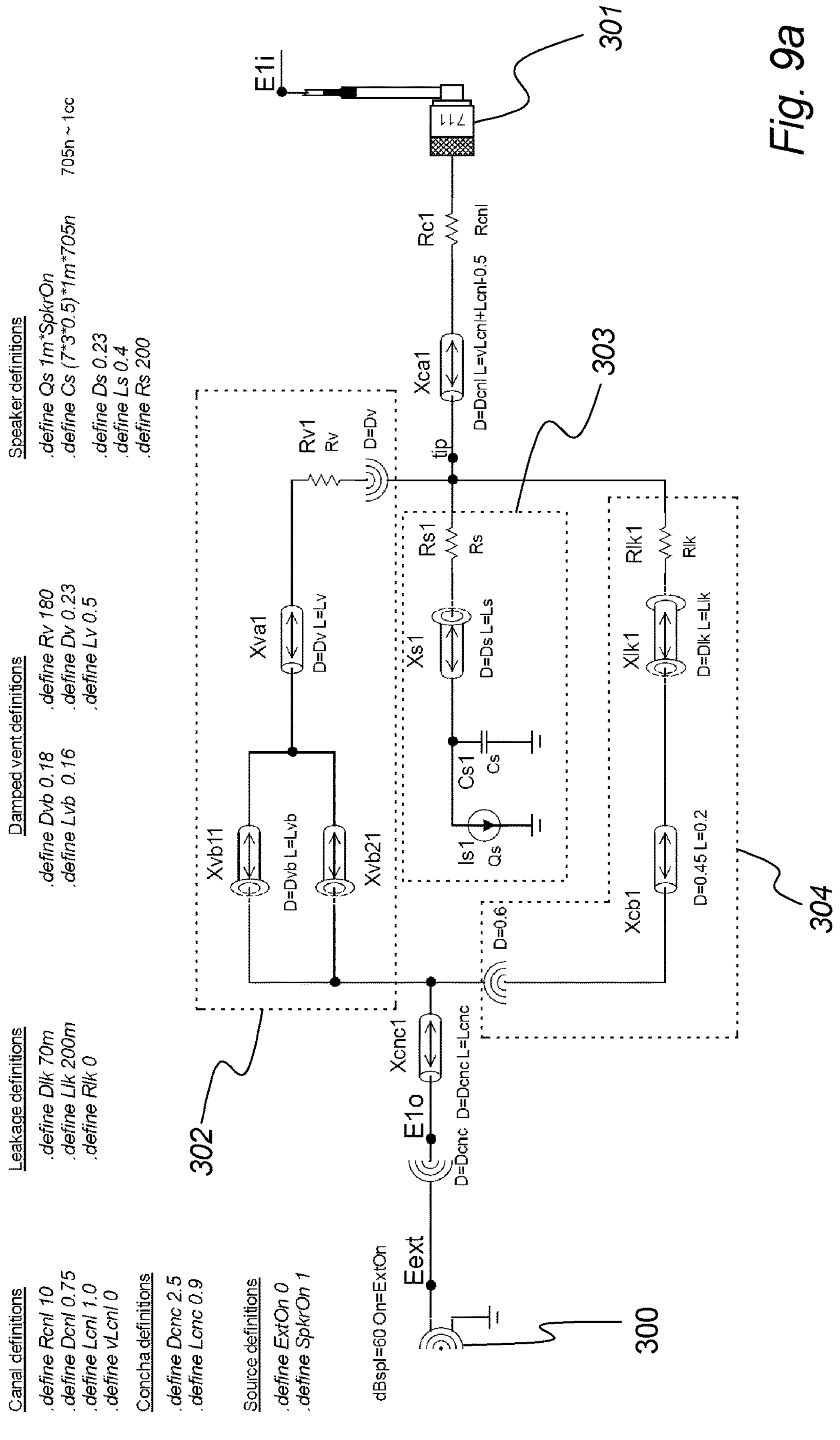
Figure 9B:
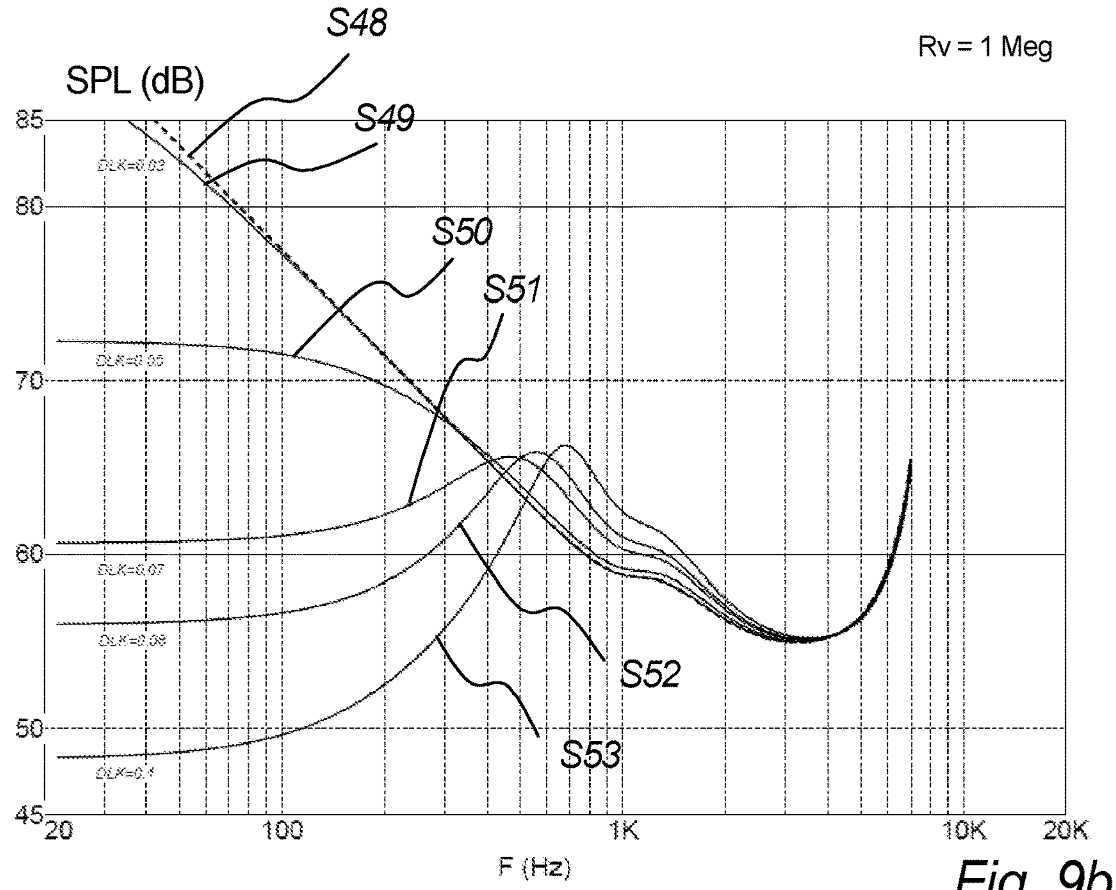
Figure 9C:
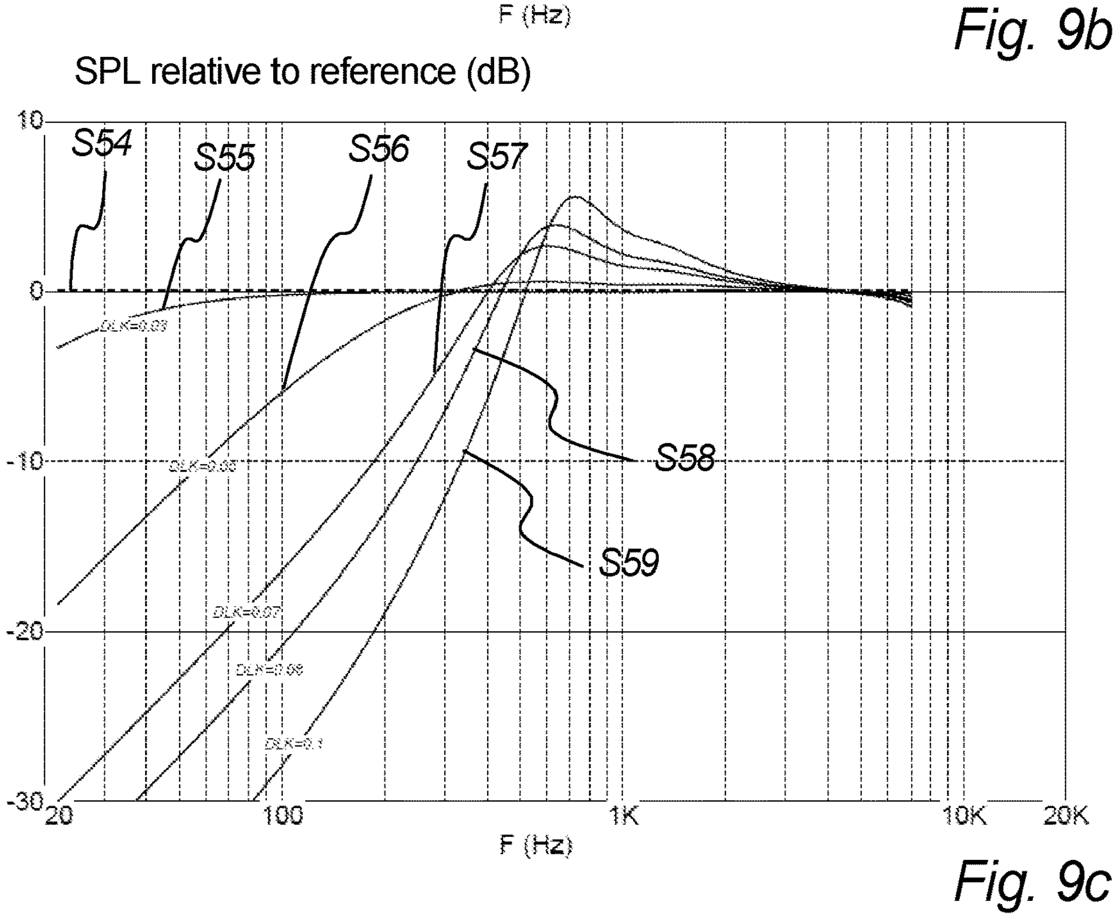
Figure 9D:
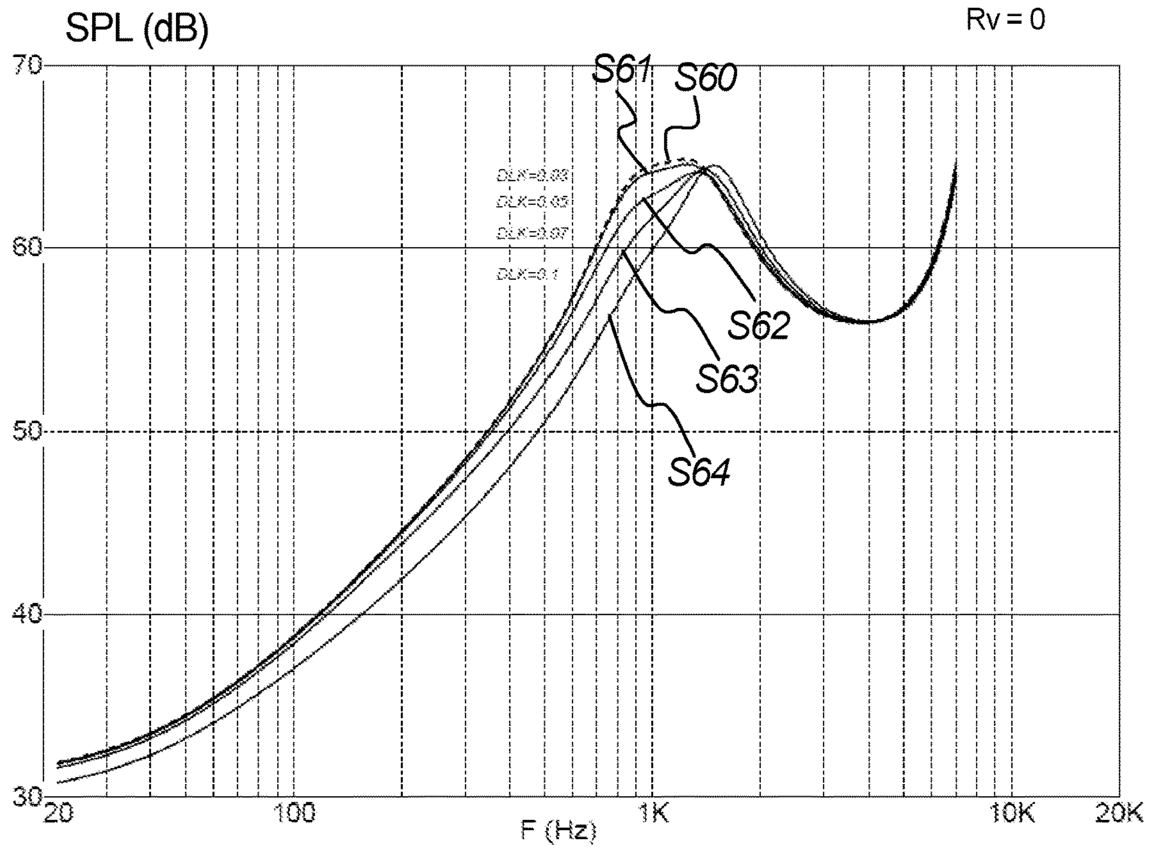
Figure 9E:
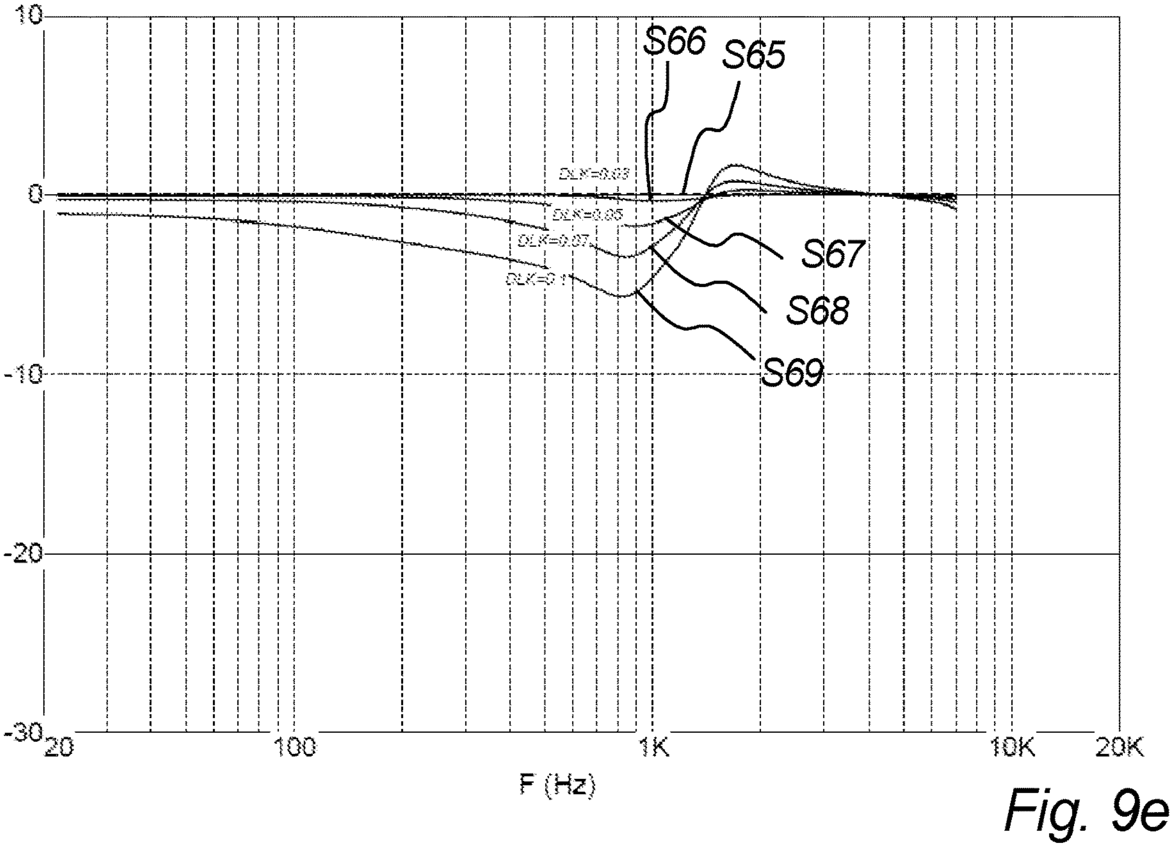
Figure 9F:
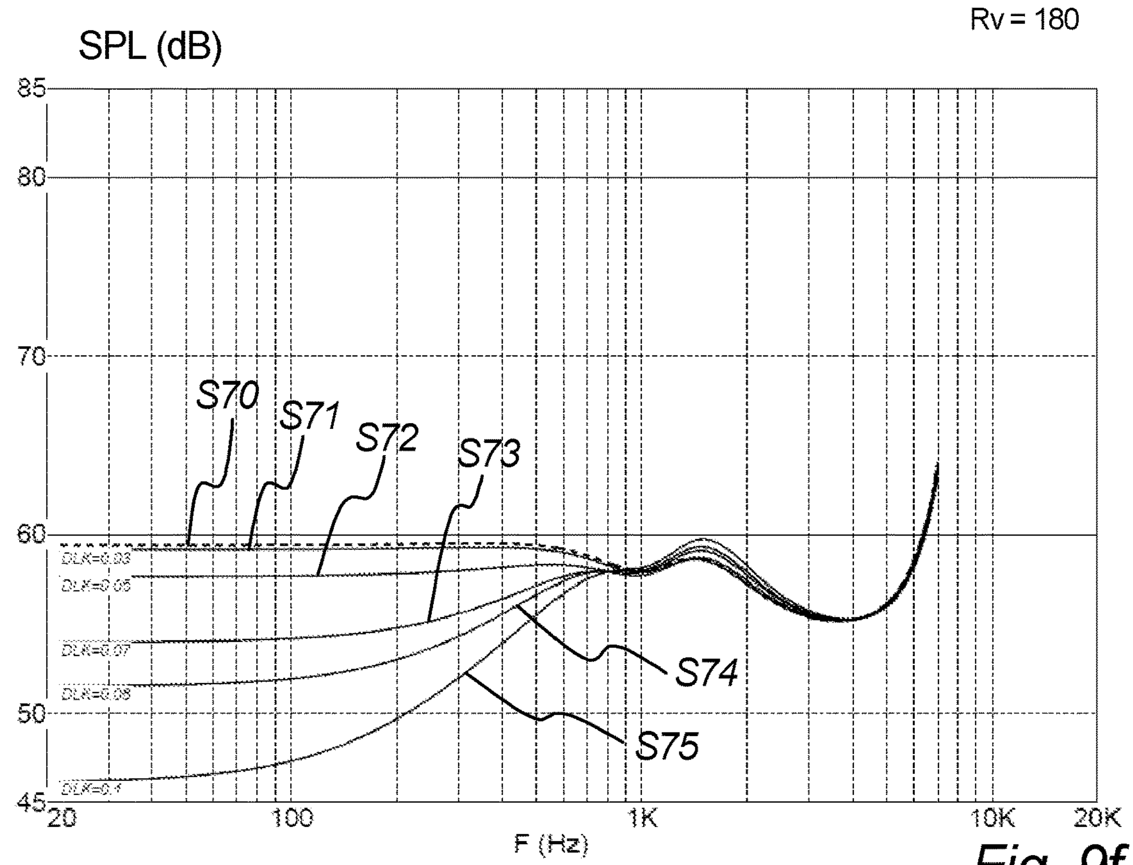
Figure 9G:
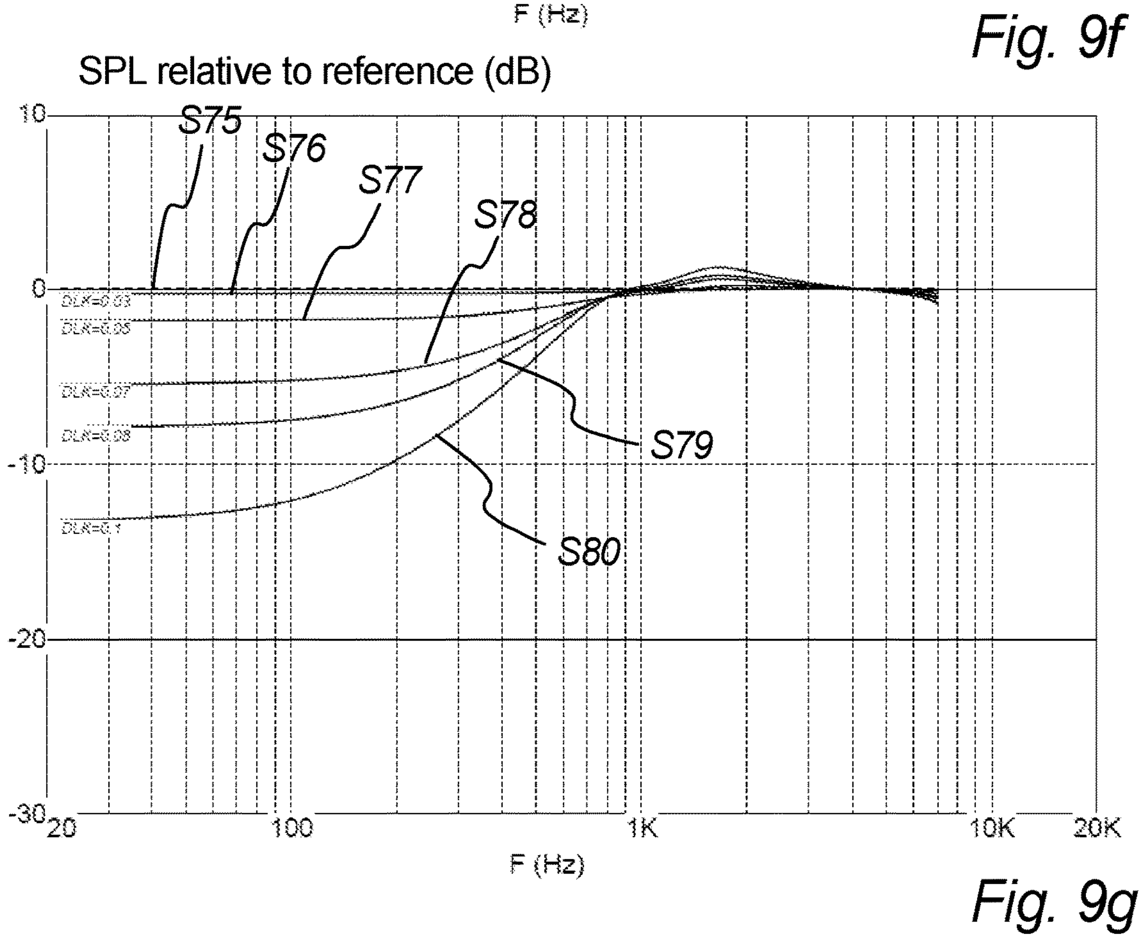
Figure 10A:
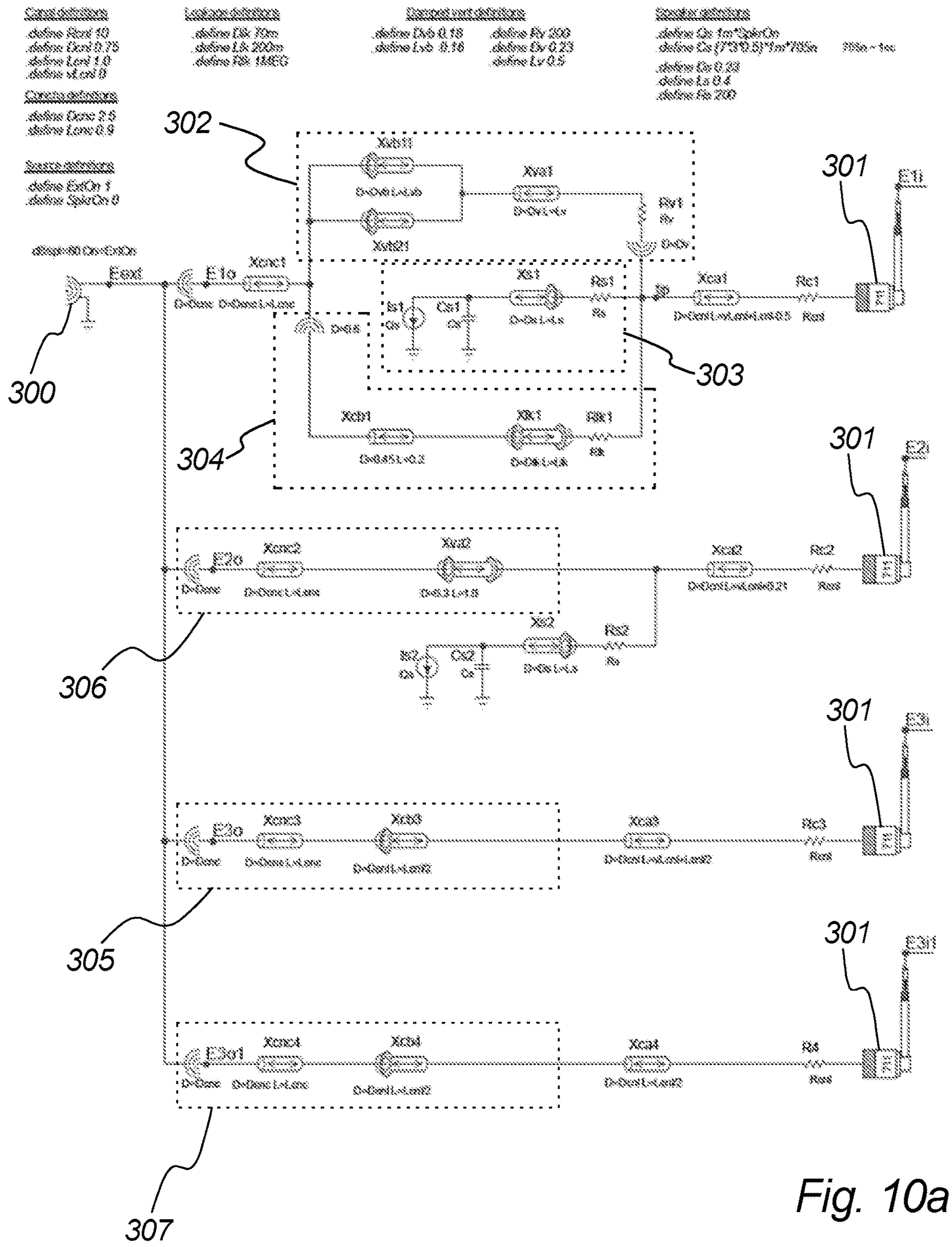
Figure 10B:
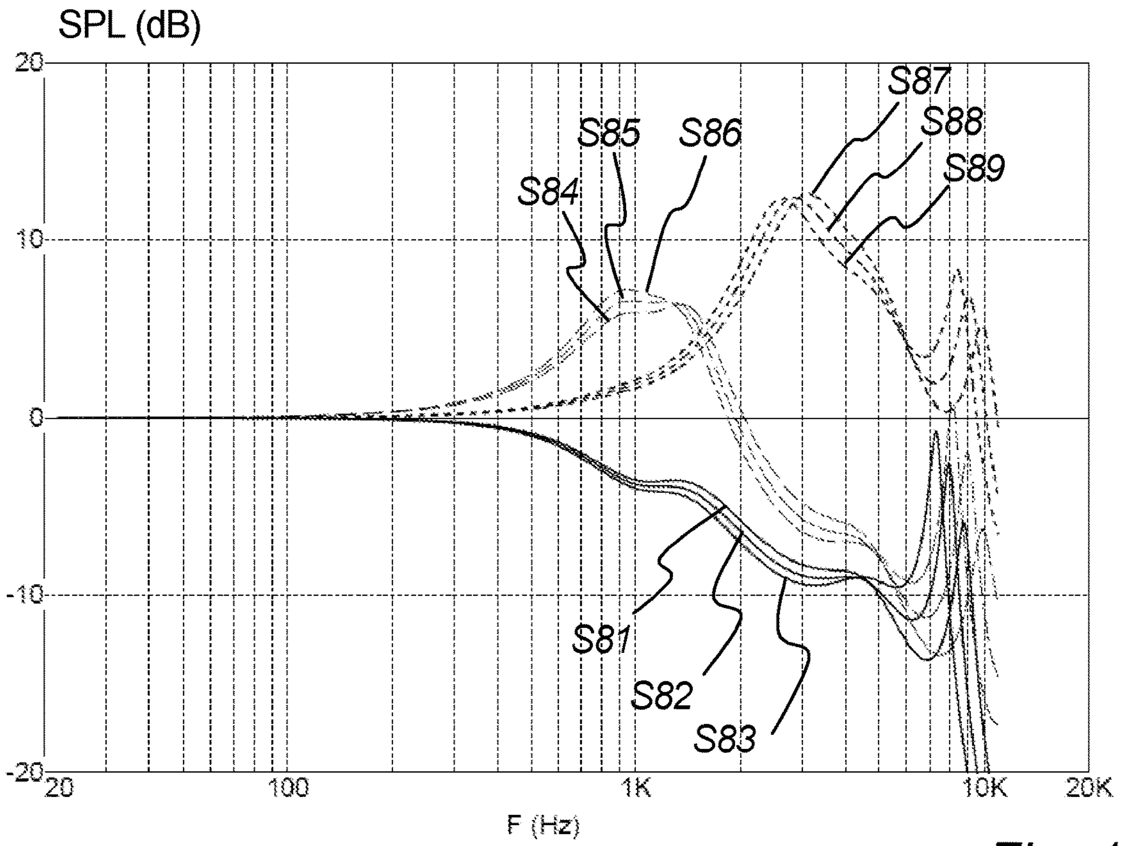
Figure 10C:
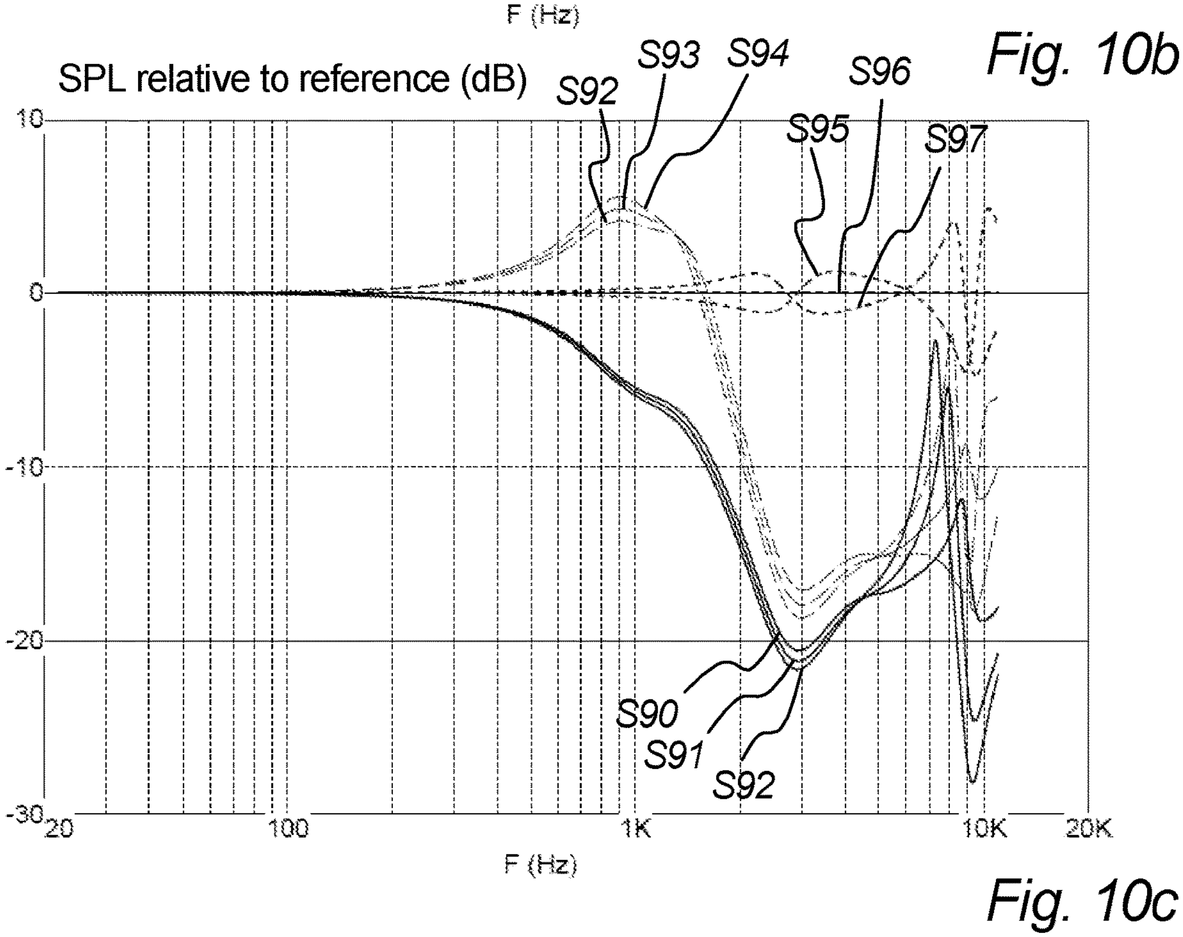

Various embodiments and advantages of the invention will in the following be described with reference to the drawings where FIG. 1 illustrates an in-ear headphone device according to an embodiment of the invention, FIG. 2 illustrates exemplary inward vent transfer functions according to the invention, FIGS. 3*a*-3*c* illustrate various in-ear headphone devices according to embodiments of the invention having different microphone layouts, FIG. 4 illustrates an in-ear headphone device with a dynamic acoustic leak, FIGS. 5*a*-*h* illustrate various layouts of the damped vent according to embodiments of the invention, FIGS. 6*a*-6*c* illustrate the effect of using dampening elements of various acoustical impedances according to some embodiments of the invention, FIGS. 7*a*-7*b* illustrate one advantageous effect of the damped vent relating to dynamic acoustic leaks, according to preferred embodiments of the invention, FIGS. 8*a*-*g* illustrate various simulated in-ear headphone devices under the influence of dynamic acoustic leaks relating to inward noise, FIGS. 9*a*-*g* illustrate various simulated in-ear headphone devices under the influence of dynamic acoustic leaks relating to audio reproduction, and FIGS. 10*a*-*c* illustrate the influence of user variance in difference scenarios.

DETAILED DESCRIPTION

FIG. 1 illustrates an in-ear headphone device 101 according to an embodiment of the invention. The illustration of FIG. 1 shows the in-ear headphone device 101 when inserted in an ear canal 110 of a user wearing the device. The in-ear headphone 101 device 101 preferably rests in the outer ear 111 of a user and is provided with a flexible ear tip 112 for providing acoustic sealing in ear canals 110 of different users.

The in-ear headphone device 101 comprises a damped vent 105 acoustically coupling the ear canal 110 with the external acoustic environment 109 outside from the ear canal 110. Ideally, the in-ear headphone device 101 has an outer shape which blocks the ear canal 110 of the user however small leak paths (not shown in the figure) may naturally occur at the interface between the flexible ear tip 112 and the ear canal 110, and these leaks may change dynamically as the user moves about and for example when the user is talking or chewing.

The damped vent 105 of this embodiment comprises a vent element 106 which is preferably formed as a circular or half-circular conduit, although other vent element designs are conceivable. The purpose of the damped vent is to facilitate transmissions of acoustic sounds between the external acoustic environment 109 and the ear canal 110, however at reduced sound pressure levels (SPL). The dampening characteristics of the damped vent 105 is provided by the dampening element 107 which in this embodiment is a damping cloth located at one end of the damped vent 105. In another embodiments of the invention, the dampening characteristics of the damped vent 105 is provided by dampening cloth at both ends of the damped vent 105 and in a yet other embodiment of the invention the dampening characteristics of the damped vent 105 is provided by slits or openings in the vent element 106.

The in-ear headphone device 101 comprises a noise microphone 102 arranged to record primarily acoustic sound from the external acoustic environment 109 and provide a recorded audio signal RAS. In the drawing of this embodiment is shown that the noise microphone 102 is arranged at the external acoustic environment facing end of the in-ear headphone device 101, however in other embodiments of the invention the noise microphone 102 may be arranged further within the in-ear headphone device 101 and be acoustically coupled to the external acoustic environment 109 by a microphone duct (not shown in the figure). The in-ear headphone device 101 further comprises a signal processor 103 configured to receive the recorded audio signal RAS and provide an active noise control signal ANCS on the basis of the received recorded audio signal RAS. A loudspeaker 104 of the in-ear headphone device 101 is arranged to reproduce the provided active noise control signal ANCS in the ear canal 110 of the user of the in-ear headphone device 101. In the drawing of this embodiment is shown that the loudspeaker 104 is contained within the in-ear headphone device 101 and acoustic sound emitted by the loudspeaker is transmitted to the ear canal 110 via a loudspeaker duct 108. However, the loudspeaker duct 108 may, in other embodiments of the invention, be dispensed with and the loudspeaker 104 may be arranged closer to the ear canal facing end of the in-ear headphone device 101. In yet other embodiments of the invention, the loudspeaker duct 108 and the damped vent 105 may be formed as two acoustically divided sub-sections of a combined acoustic port.

Since the in-ear headphone device 101 according to the invention is arranged to reproduce an active noise control signal it is thus capable of performing a method referred to as active noise control or active noise cancellation. Unwanted sound from the external acoustic environment 109 is recorded by the noise microphone 102 and based on the recorded audio signal RAS the signal processor 104 provides an active noise control signal ANCS which is designed to cancel the unwanted sound within the ear canal 110 of the user by destructive interference when reproduced by the loudspeaker 104.

FIG. 2 illustrates exemplary inward vent transfer functions $H_{VT}$. An inward vent transfer function $H_{VT}$ may be understood as the transfer function from an external environment to the ear canal, with no substantial influence from dynamic acoustic leaks or the loudspeaker. Three representations of inward vent transfer functions are shown as curves S1-S3. According to the invention, one or more dampening elements are arranged to dampen an acoustic resonance of the inward vent transfer function $H_{VT}$.

The figure displays a reference frequency range 403 from 20 Hz to 100 Hz. Based on the reference frequency range 403, a reference magnitude 400 may be determined, for example as the average sound pressure level of the inward vent transfer functions $H_{VT}$ in this range. Based on the reference magnitude 400, a resonance magnitude threshold 401 may be determined, for example, the reference magnitude threshold 401 may be 3 dB larger than the reference magnitude 400.

The curve S1 may be an inward vent transfer functions $H_{VT}$ of an in-ear headphone device with a vent without substantial damping. Consequently, the curve S1 features a resonance magnitude 405 which exceeds the resonance magnitude threshold 401. A device according to curve S1 may not encompass the advantages of the invention and is not disclosed by the claim.

The curve S2 may be an inward vent transfer functions $H_{VT}$ of an in-ear headphone device with a damped vent. The curve S2 features a resonance magnitude 405 which lies within the resonance magnitude threshold 401 according to the invention.

The curve S3 may be an inward vent transfer functions $H_{VT}$ of an in-ear headphone device with a damped vent. The resonance magnitude 405 of curve S3 is approximately equal to the reference magnitude 400. The acoustic resonance of the damped vent may for example be approximately critically damped. As such, the resonance magnitude 405 of curve S3 lies within the resonance magnitude threshold 401.

FIGS. 3*a*-3*c* illustrate various in-ear headphone devices 101 according to embodiments of the invention having different microphone layouts.

FIG. 3*a* shows the in-ear headphone device 101 of FIG. 1 also when inserted into the ear-canal 110 of a user according to a preferred embodiment of the invention. When in use, the in-ear headphone device 101 is arranged to provide at least a reproduction of an active noise control signal ANCS and this reproduced signal, in the form of acoustic sound waves, combines in the ear canal 110 with sound originating from unwanted sound sources, such as an engine of an airplane or rumbling wheels of a train or bus if the user of the in-ear headphone device 101 is commuting by airplane, train or bus, respectively. Since the active noise control signal ANCS is designed to cancel, e.g. counteract, the unwanted sound, the combined sound, as picked up by the tympanic membrane 201 of the user is effectively perceived as an acoustic null signal.

With this layout of the noise microphone 102, the noise microphone 102 primarily records sound from the external acoustic environment around the user which indirectly represents unwanted sound as the user will perceive through the headphone device.

FIG. 3*b* shows an alternative embodiment of the invention where the noise microphone 102 is arranged in the in-ear headphone device 101 in such a way that it may record sound within the ear canal 110 of the user wearing the in-ear headphone device. With this layout of the noise microphone 102, the noise microphone 102 primarily records sound from within the ear canal of a user, i.e. more or less directly measuring the unwanted sound as the user perceives it.

FIG. 3*c* shows yet another alternative embodiment of the invention, where the noise microphone 102 is arranged in a similar way to the noise microphone 102 as shown in the embodiment of FIG. 3*b*. In this embodiment of the invention, the in-ear headphone device 101 further comprises an auxiliary microphone 202 which is located in the in-ear headphone device 101 similarly to the noise microphone 102 of the embodiment shown in FIG. 3*a*.

FIG. 4 shows an in-ear headphone device 101 similar to the in-ear headphone device 101 as shown in the embodiment of FIG. 3*a* inserted in the ear canal 110 of a user wearing the device. Ideally, the flexible ear tip 112 (not shown in the figure) forms a perfect seal between the in-ear headphone device 101 and the user's ear, however in practice such a perfect seal may not be possible to establish, and small leakages may be present. The figure shows an acoustic leak 203 formed between the in-ear headphone device 101 and the user's ear. The acoustic leak 203 may take on any size and geometry depending on the shape of the user's ear and how the in-ear headphone device 101 is inserted in the ear canal 110. Furthermore, additional leak paths (not shown in the figure) may also be present and these may also take on any size ad geometry. For sake of convenience any arrangement of leakage(s) in the sealing between the in-ear headphone device 101 and the user's ear is referred to as a leak path 203, which may thus be an effective leak path. The acoustic leak 203 may also change dynamically, i.e. over time, as the user moves about, such as when the user is walking or jogging, and also when the user exercises his/her jawbone, such as when the user is speaking.

The dynamically changing acoustic leak 203 presents an entrance for unwanted sound from the external acoustic environment 109 to enter into the ear canal 110 of the user. As may be understood with reference to FIG. 4, the in-ear headphone device 101 according to any of the previously shown embodiments may also exhibit an acoustic leak 203 when inserted into a user's ear due to e.g. an improper fit of the in-ear headphone device 101.

In addition to the acoustic leak 203, the damped vent 105 also presents an entrance for unwanted sound from the external acoustic environment 109 to enter into the ear canal 110 of the user. However, unwanted sound from the external acoustic environment 109 which enters through an acoustic leak 203 may exit through the damped vent 105. In this way, the damped vent serves a dual purpose in that sound may enter from the external acoustic environment 109 and into the ear canal 110, and sound passing through an acoustic leak 203 may exit through the damped vent 105 and back into the external acoustic environment 109.

FIG. 5*a*-*h* illustrate various layouts of the damped vent 105 according to embodiments of the invention.

FIG. 5*a* shows a sideview of a damped vent 105 according to an embodiment of the invention. The damped vent 105 comprises a vent element 106 in the form of a cylinder and a dampening element 107 in the form of a damping cloth. Although the vent element 106 is illustrated as a cylindrical element in this embodiment, other geometries are also conceivable.

The dampening element 107 in the form of a damping cloth is illustrated as being located at one end of the vent element 106, however it may be positioned in any end of the vent element 106, and in another embodiment of the invention the damped vent 105 comprises dampening elements 107 in both ends of the damping vent 105. The dampening element 107 of the present embodiment is positioned within an opening of the vent element 106, however, in another embodiment of the invention the dampening element 107 may be positioned in such a way that it covers the opening of the vent element 106.

FIG. 5*b* shows a sideview of a damped vent 105 according to an embodiment of the invention. Several vent elements 106 forms a branched damped vent 105 which further comprises a dampening element 107 in the form of a damping cloth. The dampening element 107 of the present embodiment is positioned within an opening of the vent element 106, however, in another embodiment of the invention the dampening element 107 may be positioned in such a way that it covers the opening of the vent element 106. Furthermore, in other embodiments of the invention, the branched damped vent may comprise any number of dampening elements 107, such as dampening elements 107 covering all of the openings of vent elements 106.

FIG. 5*c*-5*d* shows two sideviews of a damped vent 105 according to an embodiment of the invention. FIG. 5*c* shows a damped vent 105 which is built together with a loudspeaker duct 108, to which the loudspeaker 103 may be acoustically coupled. In this embodiment of the invention, the loudspeaker duct 108 and the damped vent 105 constitutes a cylindrical acoustic tube, i.e. each of the two has a half-cylindrical geometry. In other embodiments of the invention, the loudspeaker duct 108 and the damped vent 105 may constitute a combined acoustic tube having any geometric shape. In FIG. 5*c* a dashed line c-c is shown which represents a plane c. In FIG. 5*d*, a view of the embodiment from the plane c is illustrated, showing a longitudinal geometry of the combined loudspeaker duct 108 and damped vent 105.

FIG. 5*e* illustrates an embodiment of the invention in which the in-ear headphone device 101 (not shown in the figure) comprises two separate damped vents 105. Each damped vent 105 is similar to the damped vent 101 as shown in relation to the embodiment of FIG. 5*a*. Likewise, the configuration of damped vents 105 in FIG. 5*e* comprises vent elements 106 and dampening elements 107. The dampening elements 107 of this embodiment are damping cloth present in openings of the vent elements 106, however other configurations of dampening elements are also conceivable.

FIG. 5*f* illustrates an embodiment of the invention in which the damping characteristics of the damped vent 105 is facilitated by dampening elements 107 which takes the form of slits. In another embodiment, dampening elements 107 are integrated into the vent element 106, e.g. to disturb air flow or facilitate air leakage.

FIG. 5*g* illustrates an embodiment of the invention, in which a microphone, for example the noise microphone 102, is arranged to primarily record sound from the damped vent 105. The microphone may thus be considered acoustically coupled to a vent element 106 of the damped vent 105 within the in-ear headphone device 101. In other embodiments, the in-ear headphone device 101 comprise several vent elements 106, and a microphone and/or a loudspeaker may be coupled to any of these vent elements 106 according to embodiments of the invention. In the embodiment shown in FIG. 5*g*, the damped vent 105 has a single dampening element 107 at one side. In such embodiments, the microphone may thus primarily record sound from an external environment, or primarily record sound from the ear canal, depending on the exact positioning of the dampening element 107 and the microphone.

FIG. 5*h* illustrates an embodiment of the invention in which a loudspeaker duct 108 and the damped vent are partially coupled by a dampening element 107. The damped vent 105 also further comprise dampening elements 107 at both ends of a vent element 106. The loudspeaker duct 108 and the damped vent 105 may feature any type of partitioning according to embodiments of the inventions. The loudspeaker 103 may for example be acoustically coupled to the damped vent 105 within the in-ear headphone device 101, be acoustically decoupled with the damped vent 105 within the in-ear headphone device 101 (see e.g. FIG. 5*c*), or be partially coupled with the damped vent 105 within the in-ear headphone device 101, as illustrated in FIG. 5*h*.

In the above descried embodiments of the invention, various configurations of damped vents 105 are demonstrated. However, the invention is not restricted to any specific configuration and various other embodiments are thus available to a skilled person. The damped vent configuration may be realized by any combination of the above described embodiments; thus, the damped vent configuration may comprise one or more damped vents 105, individual damped vents may comprise any number of vent elements 106 and dampening elements 107, microphones and/or loudspeaker may be acoustically coupled to vent elements or may have individual ducts, and vent and ducts may have any geometric shape.

FIGS. 6*a*-6*c* illustrate the effect of using dampening elements of various acoustical impedances according to some embodiments of the invention, compared to an open ear. The presented data has been obtained by performing a simulation of the system, using an equivalent electronics diagram as illustrated in FIG. 6*a* which may be replicated by a person skilled in the art.

The simulation shown in FIG. 6*a* corresponds to a typical embodiment of the invention. A 60 dB signal simulation source 300 corresponds to noise from an external environment, and the top ear simulation microphone 301 corresponds to sound heard in the ear. In this simulation, sound may enter the ear canal via two different paths: a vent diagram path 302 and a leak diagram path 304. The vent diagram path 302 is portioned such that the first part of the vent diagram path consists of two vent elements, which merge to a single vent element. The leak diagram path 304 has a large acoustic impedance in this specific simulation, corresponding to no substantial dynamic acoustic leak.

The vent diagram path 302 comprise an impedance Rv, corresponding to a dampening element according to the invention. For the FIGS. 6*b*-6*c*, the value of this impedance is varied, to simulate the effect of using dampening elements of different acoustical impedances.

In FIG. 6*b*, the simulated curve S4 shows a signal corresponding to an open ear. The curve has a characteristic resonance at approximately 3 kHz.

The simulated curves S5-S9 correspond to acoustical impedances Rv of 0 acoustical ohm, 45 acoustical ohm, 90 acoustical ohm, 180 acoustical ohm, and 360 acoustical ohm, respectively, where all the provided values are acoustical ohm in CGS units. As evident from the simulations, a resonance is clearly present at approximately 900 Hz when the acoustical impedance is low. However, as the acoustical impedance is increased, the resonance is damped, and for a sufficiently large acoustical impedance, no resonance peak feature is visible. If a very large acoustical impedance is chosen, a broad range of frequencies are damped, and not only the resonance. As such, for this simulated embodiment, a preferable acoustical impedance is approximately 180 acoustical ohms, since the resonance feature has been removed, but besides this, sound below the desired cut-off frequency has not been substantially damped.

For different embodiments of the invention, the preferred acoustical impedance of a dampening element may vary. The acoustical impedance may for example depend on the composition of vent elements, the cross-sectional area of vent elements, the length of vent elements, and the remaining volume of the ear canal, when the device is inserted. The primary aim of the dampening element is typically to remove a Helmholtz resonance feature, without damping additional sound unnecessarily, and the acoustical impedance should thus be chosen accordingly.

Some embodiments of the invention may also comprise several dampening elements, and preferably, their combined effect should be to suppress a Helmholtz resonance, which would occur without dampening elements, when the device is inserted.

FIG. 6*b* additionally shows how a damped vent may decrease the sound pressure in the ear at frequencies above a desired cut-off. Compared to the open ear, the attenuation may reach 20 dB or more in the region of the open ear canal resonance. At higher frequencies resonances—that may vary significantly from ear to ear—can also be attenuated by the damped vent in combination with other acoustical elements such as a damped entrance to a cavity, such as a loudspeaker front volume. In the exemplary illustration of the figure, the difference in magnitude of sound pressure level between the peak values of the two resonance features of curves S5-S9 and curve S4 at approximately 8 kHz and approximately 9 kHz, respectively, is 9 dB. This dampening effect at relatively high frequencies may be preferential in some embodiments of the invention.

FIG. 6*c* illustrates the same curves as in FIG. 6*b*, but now shown relative the simulation curve relating to an open ear S4. The curves shown in FIG. 6*c* may thus be interpreted as passive insertion gains, i.e. the change in gain experienced by a user when an inactive device is worn. Note that the simulation data has been truncated at approximately 6.5 kHz for simplicity. The insertion gain data in this frequency region is visually affected by the resonance features at 8 kHz-9 kHz shown in FIG. 6*b*, but the detailed variations in these features do not significantly affect the overall perception of sound under normal conditions with common signals.

FIGS. 7*a*-7*b* illustrate one advantageous effect of the damped vent 105, according to preferred embodiments of the invention. The presented data has been obtained by performing a simulation of the system, using an equivalent electronics diagram as illustrated in FIG. 7*a* which may be replicated by a person skilled in the art.

The simulation shown in the top part of FIG. 7*a* corresponds to a typical embodiment of the invention with a damped vent, whereas the bottom part corresponds to an in-ear headphone device without a damped vent. A 60 dB SPL signal simulation source 300 corresponds to noise at the entrance to the concha from an external environment, and the ear simulation microphones 301 correspond to sound heard in the ear for the two simulated devices. In simulations of typical embodiments of the invention, the signal may enter the ear canal via three different paths: a vent diagram path 302, an electroacoustic diagram path 303, and a leak diagram path 304. However, in the simulation shown in FIG. 7*a*-*b*, the signal simulation source 300 is only connected to the ear simulation microphone 301 via the leak diagram path 304. As such, this simulation relates to sound entering the ear through dynamic acoustic leaks. A signal which has entered through the leak diagram path 304 may exit through the vent diagram path 302, and the signal recorded by the ear simulation microphone 301 is therefore decreased.

The leak diagram paths 304 of both simulated devices of FIG. 7*a* both comprise a diagram element which has a leak diameter Dlk/DLK, corresponding to the diameter of a dynamic acoustic leak. In each figure, this leak diameter is varied to display the influence that a dynamic acoustic leak may exert on the signal reaching the ear simulation microphone 301.

FIG. 7*b* illustrates the signals reaching the ear simulation microphones, where curves S16-S20 correspond to the simulated in-ear headphone device with a damped vent, and curves S21-S25 correspond to the simulated device without a damped vent. The curves S16-S20 and S21-S25 correspond to leaks with a combined cross-sectional area equivalent to a circular cross-section with diameter of 0.035 cm, 0.05 cm, 0.07 cm, 0.08 cm, and 0.1 cm, respectively.

For the simulated curves S21-S25, any signal which has entered the region of the ear simulation microphone 301, will tend to stay at the ear simulation microphone 301, and a large signal will thus be recorded. In contrast, for the simulated curves S16-S25, the sound pressure level recorded by ear simulation microphone 301 is remarkably lower, since a signal in the region of the ear simulation microphone 301 may leave this region through the vent diagram path 302. For example, for a leak diameter of 0.05 cm, the difference in the leak-contributed sound pressure level at 200 Hz is approximately 12 dB between the simulated devices as displayed by curves S17 and S22.

The simulation and its results as illustrated in FIG. 7*a*-*b* therefore serve as evidence that embodiments of the invention may reduce the influence of dynamic acoustic leaks in the ear canal by allowing sound to exit through the damped vent.

FIGS. 8*a*-*g* illustrate various simulated in-ear headphone devices under the influence of dynamic acoustic leaks, the devices having either no vent, an open undamped vent, or having a damped vent.

The presented data has been obtained by performing a simulation of the system, using an equivalent electronics diagram as illustrated in FIG. 8*a* which may be replicated by a person skilled in the art.

The simulation diagram shown in FIG. 8*a* corresponds to an in-ear headphone device. A 60 dB SPL constant-pressure signal simulation source 300 corresponds to noise at the entrance of the concha from an external environment, and an ear simulation microphone 301 corresponds to sound heard in the ear. A signal may reach the ear simulation microphone 301 via three different paths: a vent diagram path 302, an electroacoustic diagram path 303, and a leak diagram path 304. However, in the simulations relating to FIGS. 8*a*-*g*, the electroacoustic diagram path 303 does not carry a signal.

The vent diagram path 302 is portioned such that the first part of the vent diagram path consists of two vent elements, which merge to a single vent element, where an impedance Rv is located. For the various figures FIGS. 8*b*-8*c*, FIGS. 8*d*-8*e*, and FIGS. 8*f*-8*g*, the value of the impedance is varied to simulate a device with no vent (large impedance), a device with an open, undamped vent (small impedance), and a damped vent (intermediate impedance), respectively.

The leak diagram path 304 has a leak diameter Dlk/DLK, corresponding to the equivalent diameter of a dynamic acoustic leak. In each figure, this leak diameter is varied to display the influence that a dynamic acoustic leak may exert on the signal reaching the ear simulation microphone 301.

FIGS. 8*b*-8*c* illustrate the signal reaching the ear simulation microphone 301 for a device with no vent, i.e. Rv=1 megaohm (acoustical) in CGS units, where FIG. 8*b* shows the sound pressure level magnitude of the transferred signal, and FIG. 8*c* shows the phase of the transferred signal. Both these entities are relevant for active noise control. The curves S26-S28 and S29-S31 correspond to leak diameters of 0.05 cm, 0.07 cm, and 0.1 cm, respectively.

FIG. 8*b* clearly illustrates how dynamical leaks may influence the signal magnitude, e.g. influence the magnitude of the inward total transfer function $H_{TI}$. Particularly in the range from 400 Hz and upward, the difference in sound pressure level is 10 dB to 15 dB.

Furthermore, FIG. 8*c* illustrates how dynamical leaks may additionally influence the signal phase, particularly in the range from 100 Hz to 700 Hz.

As such, these simulations illustrate the enormous effect that dynamic acoustic leaks may have for an in-ear headphone device with no vent.

FIGS. 8*d*-8*e* illustrate the signal reaching the ear simulation microphone 301 for a device with an open undamped vent, i.e. Rv=0, where FIG. 8*d* shows the sound pressure level magnitude of the transferred signal, and FIG. 8*e* shows the phase of the transferred signal. Both these entities are relevant for active noise control. The curves S32-S35 and S36-S39 correspond to leak diameters of 0 cm, 0.05 cm, 0.07 cm, and 0.1 cm, respectively.

FIG. 8*d* shows how an in-ear headphone device with an open vent may suffer from the presence of a Helmholtz resonance. The addition of a dynamic acoustical leak may shift the location of this resonance to a different frequency, which can be problematic to continuously handle for a device arranged to provide active noise control.

FIG. 8*e* illustrates the signal phase in a device with an undamped vent, and how dynamic acoustic leaks influence the signal phase. Below 500 Hz, the phase is relatively well behaved, regardless of any dynamic acoustic leaks. However, approaching 1 kHz from below, the phase has a sharp downwards trend. Generally, this sharp transition is disadvantageous for active noise control purposes. Dynamic acoustical leaks may shift this sharp transition around, which further problematizes this phase behavior.

As such, these simulations illustrate how a device with an undamped vent may have severe problems in providing optimal active noise control.

FIGS. 8*f*-8*g* illustrate the signal reaching the ear simulation microphone 301 for a device with a damped vent, i.e. Rv=180 acoustical ohm in CGS units, where FIG. 8*f* shows the sound pressure level magnitude of the transferred signal, and FIG. 8*g* shows the phase of the transferred signal. Both these entities are relevant for active noise control. The curves S40-S43 and S44-S47 correspond to leak diameters of 0 cm, 0.05 cm, 0.07 cm, and 0.1 cm, respectively.

FIG. 8*f* illustrates how dynamical leaks may influence the signal magnitude. In comparison with simulations for a device with no vent (FIG. 8*b*-8*c*), the influence of the leaks is significantly smaller. For example, at 1 kHz, the difference in sound pressure level between a leak diameter of 0.05 cm and 0.1 cm is approximately 3 dB with a damped vent, whereas this difference is approximately 15 dB with no vent. In comparison with simulations with an undamped vent (FIG. 8*d*-8*e*), the simulations with a damped vent display no Helmholtz resonance. A resonance-like feature does arise for larger leaks, but this feature is more well behaved than the Helmholtz resonance shown in FIG. 8*d*, which shifts frequency as the leak size is changed.

FIG. 8*g* illustrates the signal phase in a device with a damped vent, and how dynamic acoustic leaks influence this signal phase. Across the entire range relevant for active noise control, i.e. frequencies up to approximately 1 kHz, the phase is well behaved for any of the simulated dynamic acoustic leaks.

The simulations of FIGS. 8*a*-8*g* are thus evidence that, in the context of dynamic acoustic leaks, an in-ear headphone device with a damped vent is superior for active noise control purposes, compared to devices without a vent and with an undamped vent. Particularly, it has been shown that variations due to dynamic acoustic leaks influencing the magnitude of the inward total transfer function $H_{TI}$ may be reduced and distortion due to dynamic acoustic leaks influencing the phase of the inward total transfer function $H_{TI}$ may be reduced. These improvements may be obtained by the control and dampening of the Helmholtz resonance established by the ear canal and an acoustical path to the environment.

FIGS. 9*a*-*g* illustrate various simulated in-ear headphone devices under the influence of dynamic acoustic leaks, the devices having either no vent, an open undamped vent, or having a damped vent. Particularly, an electroacoustic diagram path comprises a simulated loudspeaker generating a signal, which is transmitted to an ear simulation microphone 301.

The presented data has been obtained by performing a simulation of the system, using an equivalent electronics diagram as illustrated in FIG. 9*a* which may be replicated by a person skilled in the art.

The simulation diagram shown in FIG. 9*a* corresponds to an in-ear headphone device. For the purpose of illustration, a simple loudspeaker model consisting of a constant volume velocity source and a front volume is established. The simulated loudspeaker delivers the signal to the ear canal through diagram path 303. The amplitude of the constant volume velocity source is adjusted to yield a signal of approximately 60 dB SPL at low frequencies in the ear simulation microphone. The behavior of this signal at the ear simulation microphone 301 is of relevance to active noise control and reproduction of a desired audio signal. The signal may typically partially reach the ear simulation microphone 301, and partially exit the simulated ear canal region through a vent diagram path 302, and a leak diagram path 304.

The vent diagram path 302 is portioned such that the first part of the vent diagram path consists of two vent elements, which merge to a single vent element, where an impedance Rv is located. For the various figures FIG. 9*b*-9*c*, FIG. 9*d*-9*e*, and FIG. 9*f*-9*g*, the value of the impedance is varied to simulate a device with no vent (large impedance), a device with an open, undamped vent (small impedance), and a damped vent (intermediate impedance), respectively.

The leak diagram path 304 has a leak diameter Dlk/DLK, corresponding to the cross-section of a dynamic acoustic leak. In each figure, this leak diameter is varied to display the influence that a dynamic acoustic leak may exert on the signal reaching the ear simulation microphone 301.

FIGS. 9*b*-9*c* illustrate the signal reaching the ear simulation microphone 301 for a device with no vent, i.e. Rv=1 megaohm (acoustical) in CGS units, where FIG. 9*b* shows the sound pressure level magnitude of the signal, and FIG. 9*c* shows the sound pressure level magnitude of the signal relative to a reference signal with no dynamic acoustic leak. The curves S48-S53 and S54-S59 correspond to leak diameters of 0 cm, 0.03 cm, 0.05 cm, 0.07 cm, 0.08 cm, and 0.1 cm, respectively.

FIGS. 9*b*-9*c* clearly illustrate how dynamical leaks may influence the magnitude of a signal from a loudspeaker reaching the ear in an in-ear device with no vent relating to the transfer function from loudspeaker to the ear drum, also relating to the outwards total transfer function $H_{TO}$. Particularly at low frequencies, the influence of leaks is enormous, e.g. at 150 Hz, the difference in sound pressure level between the shown curves is more than 25 dB. Furthermore, this difference in sound pressure level is significant up to more than 1 kHz.

As such, these simulations illustrate the massive influence that dynamic acoustic leaks may have for an in-ear headphone device with no vent.

FIGS. 9*d*-9*e* illustrate the signal reaching the ear simulation microphone 301 for a device with an open undamped vent, i.e. Rv=0, where FIG. 9*b* shows the sound pressure level magnitude of the signal, and FIG. 9*c* shows the sound pressure level magnitude of the signal relative to a reference signal with no dynamic acoustic leak. The curves S60-S64 and S65-S69 correspond to leak diameters of 0 cm, 0.03 cm, 0.05 cm, 0.07 cm, and 0.1 cm, respectively.

FIG. 9*d* clearly illustrate how an in-ear headphone device with an open, undamped vent may suffer from extensive loss of sound, relating to the impedance of the outward sound path. Particularly in the bass frequency regime, the signal recorded by the ear simulation microphone 301 is 20 dB-30 dB lower than the signal of 60 dB emitted from the simulated loudspeaker.

These simulations thus show that a device with an undamped vent is ill-suited for audio reproduction.

FIGS. 9*f*-9*g* illustrate the signal reaching the ear simulation microphone 301 for a device with a damped vent, i.e. Rv=180 acoustical ohm in CGS units, where FIG. 9*f* shows the sound pressure level magnitude of the signal, and FIG. 9*g* shows the sound pressure level magnitude of the signal relative to a reference signal with no dynamic acoustic leak. The curves S70-S75 and S76-S80 correspond to leak diameters of 0 cm, 0.03 cm, 0.05 cm, 0.07 cm, 0.08 cm, and 0.1 cm, respectively.

The simulation curves of FIGS. 9*f*-9*g* show a large reduction of difference in magnitude between the curves of different simulated leak diameters in comparison with FIGS. 9*b*-9*c*. Furthermore, a comparison between FIG. 9*d* and FIG. 9*f* shows that a device with a damped vent do not suffer from extensive loss of sound in the bass frequency regime.

The simulations of FIGS. 9*a*-9*g* are thus evidence that, in the context of dynamic acoustic leaks, an in-ear headphone device with a damped vent is superior for active noise control purposes and sound reproduction, compared to devices without a vent and with an undamped vent. An in-ear headphone device with a damped vent may provide an advantageous balance between a low magnitude of the outward total transfer function $H_{TO}$ and variations of the outward total transfer function $H_{TO}$ due to dynamic acoustic leaks, especially at low frequencies. As such, it has been shown that distortion due the influence of dynamic acoustic leaks on the outward total transfer function $H_{TO}$ affecting loudspeaker feedback and active noise control may be reduced, and at the same time limiting the reduction in sound pressure from the loudspeaker at the ear drum due to sound exiting via the vent.

FIGS. 10*a*-10*c* illustrate the influence of user variance, e.g. different ear canal sizes between users and different insertion positions, in difference scenarios: an open ear, an in-the-canal device with an open vent, and an in-ear headphone device with a damped vent.

The simulation diagram shown in FIG. 10*a* corresponds to (from top to bottom) an in-ear headphone device with a damped vent, an in-the canal device, an open ear, and a reference open ear. A 60 dB signal simulation source 300 corresponds to noise from an external environment, and the various ear simulation microphones 301 corresponds to sound heard in the ear in the difference scenarios.

Before ear simulation microphones 301, a diagram element is located, which simulates an ear canal. In the simulations, the simulated ear canal depends on a parameter vLcnl/CLCNL, corresponding to the size of a portion of the ear canal, and this parameter is varied, to study the influence of user variance. The diagram element after the reference open ear diagram path 307 simulating an ear canal is not varied and the simulated signal recorded by the corresponding ear simulation microphone is used for reference.

FIG. 10*b* illustrates the signals reaching the various ear simulation microphones, where curves S81-S83 correspond to the simulated in-ear headphone device with a damped vent, curves S84-S86 correspond to the simulated in-the-canal device, and curves S87-S89 correspond to the open ear. The simulated size of the portion of the ear canal is –0.2 cm, 0 cm, and 0.2 cm within each scenario.

Generally, above 6 kHz-7 kHz, all the curves are dominated by sharp resonance features. These features are typical for ears at these frequencies. Inserting an in-ear headphone device may change alter these features, but the resonant behavior will typically persist in some form.

Additionally, the open ear curves S87-S89 all display a well-known natural resonance of the ear at approximately 3 kHz, and the in-the canal curves S84-S86, display a Helmholtz resonance at approximately 1 kHz. In contrast, the damped vent curves S81-S83 show no resonance features below 6 kHz-7 kHz.

Active noise control is typically implemented at frequencies up to 1 kHz. In this range, it is primarily the in-the canal curves S84-S86 which are influenced by user variance. In contrast, the damped vent curves S81-S83 are minimally influenced.

FIG. 10*c* illustrates the same curves as in FIG. 10*b*, but now shown relative to a curve obtained by a reference open ear diagram path 307. The curves shown in FIG. 10*c* may thus be interpreted as passive insertion gains, i.e. the change in gain experienced by a user when an inactive device is worn.

The simulations of FIGS. 10*a*-10*c* are evidence that, in context of user variance, an in-ear headphone device with a damped vent is an improvement compared to an in-the-canal device with an open vent. Particularly, the simulations show distortion due to user variance influencing the magnitude of the inward total transfer function $H_{TI}$ may be reduced, according to embodiments of the invention.

LIST OF REFERENCE SIGNS

101 In-ear headphone device
102 Noise microphone
103 Signal processor
104 Loudspeaker
105 Damped vent
106 Vent element
107 Dampening element
108 Loudspeaker duct
109 External acoustic environment
110 Ear canal
111 Pinna (outer ear)
112 Flexible ear tip
201 Tympanic membrane (ear drum)
202 Auxiliary microphone
203 Acoustic leak
300 Signal simulation source
301 Ear simulation microphone
302 Vent diagram path
303 Electroacoustic diagram path
304 Leak diagram path
305 Open ear diagram path
306 In-the-canal diagram path
307 Reference open ear diagram path
400 Reference magnitude
401 Resonance magnitude threshold
402 Magnitude threshold distance
403 Reference frequency range
404 Resonance frequency range
405 Resonance magnitude
S1-S97 Simulation signal curves
RAS Recorded audio signal
ANCS Active noise control signal
$H_{VI}$, $H_{VO}$ Inward vent transfer function, Outward vent transfer function
$H_{LI}$, $H_{LO}$ Inward leak transfer function, Outward leak transfer function
$H_{TI}$, $H_{TO}$ Inward total transfer function, Outward total transfer function
$H_{EI}$ Inward electro-acoustic transfer function

The invention claimed is:

1. An in-ear headphone device for insertion in an ear canal of a person, said in-ear headphone device comprising:

a noise microphone, a loudspeaker and a signal processor arranged to provide an active noise control signal on the basis of a recorded audio signal from said noise microphone, wherein said loudspeaker is arranged to reproduce said active noise control signal in said ear canal; and a damped vent comprising one or more vent elements and one or more dampening elements, said damped vent being arranged to couple said ear canal to an external acoustic environment;

wherein said damped vent is characterized by an inward vent transfer function $H_{VI}$ from said external acoustic environment to said ear canal; and wherein said damped vent is arranged to dampen an acoustic resonance of said one or more vent elements such that a resonance magnitude of said inward vent transfer function $H_{VI}$ of said damped vent in a resonance frequency range from 100 Hz to 2 kHz is maximally 3 dB greater than a reference magnitude of said inward vent transfer function $H_{VI}$ in a reference frequency range from 20 Hz to 100 Hz.

2. The in-ear headphone device of claim 1, wherein said inward vent transfer function $H_{VI}$ and said acoustic resonance are properties of said damped vent when said in-ear headphone device is inserted in an ear-canal of said person.

3. The in-ear headphone device of claim 1, wherein said loudspeaker and said damped vent are acoustically separated inside said in-ear headphone device.

4. The in-ear headphone device of claim 3, wherein said loudspeaker and said damped vent are acoustically separated by one or more of a dampening element inside said in-ear headphone device and individual ducts coupling said loudspeaker and said damped vent to said ear canal.

5. The in-ear headphone device of claim 1, wherein said noise microphone is arranged to primarily record sound from one or more of said external acoustic environment and said ear canal.

6. The in-ear headphone device of claim 1, wherein a microphone arranged to primarily record sound from said ear canal is coupled to said ear canal via an individual microphone duct.

7. The in-ear headphone device of claim 1, wherein a microphone is acoustically coupled to said ear canal via said damped vent.

8. The in-ear headphone device of claim 1, wherein said signal processor provides said active noise control signal on the basis of an estimated inward total transfer function $H_{TI}$.

9. The in-ear headphone device of claim 8, wherein said estimated inward total transfer function $H_{TI}$ is based on one or more of an estimation of said inward vent transfer function $H_{VI}$, a difference of recordings of sound of said external acoustic environment and said ear canal, respectively, and an estimated outward total transfer function $H_{TO}$.

10. The in-ear headphone device of claim 9, wherein said estimated outward total transfer function $H_{TO}$ is based on a difference of sound reproduced by said loudspeaker and sound recorded by said noise microphone.

11. The in-ear headphone device of claim 1, wherein said signal processor is arranged with an active noise control algorithm to provide said active noise control signal.

12. The in-ear headphone device of claim 1, wherein said estimated inward total transfer function $H_{TI}$ comprises a time-varying inward transfer function component comprising an inward leak transfer function $H_{LI}$, and a static inward transfer function component comprising said inward vent transfer function $H_{VI}$.

13. The in-ear headphone device of claim 1, wherein said signal processor is arranged to update a representation of said estimated inward total transfer function $H_{TI}$.

14. The in-ear headphone device of claim 1, wherein said signal processer is arranged to provide an active occlusion control signal and said loudspeaker is arranged to reproduce said active occlusion control signal in said ear canal, and wherein said active occlusion control signal is based on a signal recorded from a microphone arranged to primarily record sound from said ear canal.

15. The in-ear headphone device of claim 1, wherein said device further comprises an electroacoustic path comprising a microphone primarily recording environment sound, a variable gain, and said loudspeaker, wherein said electroacoustic path is arranged to couple said external acoustic environment to said ear canal.

16. The in-ear headphone device of claim 15, wherein said electroacoustic path is characterized by an inward electro transfer function $H_{EI}$ having a high-pass characteristic having a high-pass cut-off frequency.

17. The in-ear headphone device of claim 16, wherein said electroacoustic path is arranged to apply a high-pass gain for frequencies above said high-pass cut-off frequency.

18. The in-ear headphone device of claim 1, wherein said one or more dampening elements comprises one or more selected from the list of a dampening cloth, a dampening net, a dampening foam and dampening slits.

19. The in-ear headphone device of claim 1, wherein said one or more dampening element are characterized by an acoustic impedance, wherein said acoustic impedance is in the range from 20 acoustic ohm to 500 acoustic ohm.

20. An in-ear headphone device set comprising a first in-ear headphone device and a second in-ear headphone device;

wherein said first in-ear headphone device is arranged to be fitted into a first outer ear of a user and wherein said second in-ear headphone device is arranged to be fitted into a second outer ear of said user;

wherein said first in-ear headphone device and said second in-ear headphone device both comprise:

a noise microphone, a loudspeaker and a signal processor arranged to provide an active noise control signal on the basis of a recorded audio signal from said noise microphone, wherein said loudspeaker is arranged to reproduce said active noise control signal in a respective ear canal of said user; and a damped vent comprising one or more vent elements and one or more dampening elements, said damped vent being arranged to couple said ear canal to an external acoustic environment;

wherein said damped vent is characterized by an inward vent transfer function $H_{VI}$ from said external acoustic environment to said ear canal; and wherein said damped vent is arranged to dampen an acoustic resonance of said one or more vent elements such that a resonance magnitude of said inward vent transfer function $H_{VI}$ of said damped vent in a resonance frequency range from 100 Hz to 2 kHz is maximally 3 dB greater than a reference magnitude of said inward vent transfer function $H_{VI}$ in a reference frequency range from 20 Hz to 100 Hz.

* * * * *